United States Patent
Nakamura et al.

(10) Patent No.: US 9,151,234 B2
(45) Date of Patent: Oct. 6, 2015

(54) ENGINE CONTROL APPARATUS FOR A VEHICLE AND VEHICLE INCORPORATING SAME

(75) Inventors: Masanori Nakamura, Saitama (JP); Kenichi Machida, Saitama (JP)

(73) Assignee: Honda Motor Co., Ltd., Tokyo (JP)

(*) Notice: Subject to any disclaimer, the term of this patent is extended or adjusted under 35 U.S.C. 154(b) by 547 days.

(21) Appl. No.: 13/596,290

(22) Filed: Aug. 28, 2012

(65) Prior Publication Data
US 2013/0073191 A1 Mar. 21, 2013

(30) Foreign Application Priority Data
Sep. 15, 2011 (JP) ................................. 2011-201594

(51) Int. Cl.
 B60T 7/12 (2006.01)
 F02D 31/00 (2006.01)
 F02D 41/02 (2006.01)
 F02D 41/08 (2006.01)

(52) U.S. Cl.
 CPC .......... F02D 31/003 (2013.01); F02D 41/0255 (2013.01); F02D 41/086 (2013.01); F02D 2200/021 (2013.01); F02D 2200/0404 (2013.01); F02D 2200/101 (2013.01); Y02T 10/26 (2013.01)

(58) Field of Classification Search
 CPC .......... F02D 41/0002; F02D 2041/001; F02D 41/14; G01L 23/22
 USPC .......... 701/103, 110, 111, 113; 123/434, 436, 123/676, 685, 686, 687, 689, 339.1, 339.22, 123/339.23, 339.24
 See application file for complete search history.

(56) References Cited

U.S. PATENT DOCUMENTS

| | | | | | |
|---|---|---|---|---|---|
| 4,344,398 | A | * | 8/1982 | Ikeura | 123/339.22 |
| 4,345,557 | A | * | 8/1982 | Ikeura | 477/111 |
| 4,402,289 | A | * | 9/1983 | Ikeura | 123/339.22 |
| 4,406,262 | A | * | 9/1983 | Ikeura | 123/339.17 |
| 4,886,035 | A | * | 12/1989 | Tomobe et al. | 123/588 |
| 5,415,143 | A | * | 5/1995 | Togai | 123/339.17 |
| 5,970,947 | A | * | 10/1999 | Iida et al. | 123/295 |

FOREIGN PATENT DOCUMENTS

JP 2010-007585 A 1/2010

* cited by examiner

*Primary Examiner* — John Kwon
(74) *Attorney, Agent, or Firm* — Carrier Blackman & Associates, P.C.; Joseph P. Carrier; Anne G. Sabourin

(57) ABSTRACT

An engine control apparatus includes a control unit configured to perform a feedback control based on a second amount of intake air until a engine speed reaches a target idle speed. The engine control apparatus then regulates the amount of intake air to an amount smaller than a predetermined second amount of intake air for a predetermined period when the engine speed exceeds the target idle speed, and then performs a feedback control based on a first amount of intake air. Such engine control apparatus minimizes variation in engine speed by reducing a convergence time of the engine speed to a target idle speed in switching control of the amount of intake air in a case where engine friction at a low temperature is high.

11 Claims, 17 Drawing Sheets

ENGINE CONTROL APPARATUS FOR A VEHICLE AND VEHICLE INCORPORATING SAME

CROSS-REFERENCE TO RELATED APPLICATIONS

The present invention claims priority under 35 USC 119 based on Japanese patent application No. 2011-201594, filed on Sep. 15, 2011. The entire subject matter of this priority document, including specification claims and drawings thereof, is incorporated by reference herein.

BACKGROUND OF THE INVENTION

1. Field of the Invention

The present invention relates to an engine control apparatus for a vehicle and to a vehicle incorporating the same. More particularly, the present invention relates to an engine control apparatus configured to adjust the amount of intake air supplied to an engine, and to a vehicle incorporating the same.

2. Description of the Background Art

The Japanese Patent Document JP-A-2010-7585 discloses an engine control system which increases an intake air flow rate above a flow rate prescribed for a normal idling state, to increase a engine speed to approach a target idle speed, in order to activate an exhaust air purifying catalyst in an early stage during a warm-up operation immediately after starting of an engine. The engine control system of JP-A-2010-7585 stops increasing the amount of intake air, and performs a feedback control on the engine speed with a normal amount of intake air after a predetermined time has elapsed.

However, in the engine control system disclosed in Japanese Patent Document JP-A-2010-7585, since the amount of intake air is configured to be switched when the predetermined time has elapsed, increase in the engine speed is delayed when the water temperature or the oil temperature is low and friction is high, so that the predetermined time has elapsed and the amount of intake air is switched to a smaller value before the engine speed reaches a target idle speed, which may reduce the engine speed at the time of the switching and cause a variation that the engine speed is momentarily reduced.

Therefore, in order to prevent such a phenomenon, switching the timing of the change in the amount of intake air to a time point when the target idle speed is reached is contemplated. However, when an operator opens a throttle to increase the engine speed, the engine speed temporarily increases to a level higher than the target idle speed, and hence the amount of intake air is switched to a smaller value. Consequently, since the feedback control is performed with a smaller amount of intake air at the time point when the throttle is returned, the problem that the engine speed reduced temporarily is not resolved.

Accordingly, it is one of the objects of the present invention to provide an engine control apparatus which is free from a variation in engine speed by reducing a convergence time of the engine attaining a target idle speed in switching control of the amount of intake air in a case where engine friction at a low temperature is high.

SUMMARY OF THE INVENTION

In the following summary description, reference numbers from the drawings are used for purposes of illustration, and are not intended to limit the present invention. In order to achieve the above objects, the present invention according to a first aspect thereof provides an engine control apparatus (100), including: an engine (22); an intake air flow control valve (57) provided in an intake air duct (56) of the engine (22) and configured to adjust the amount of intake air supplied to the engine (22); a engine speed sensor (120) configured to detect the engine speed of the engine (22); a temperature sensor configured to detect the warm-up state of the engine (22); and a control unit (122) configured to operate the intake air flow control valve (57) so that the amount of intake air becomes a second amount of intake air (ITWS) which is larger than a first amount of intake air (ITWA) used at the time of normal idling operation and perform a feedback control so that the engine speed reaches a target idle speed when the engine (22) is not in the warm-up state, and perform the feedback control by the first amount of intake air (ITWA) after predetermined requirements are satisfied, wherein the control unit (122) performs a feedback control based on a second amount of intake air (ITWS) until the engine speed reaches the target idle speed, then controls the amount of intake air to be fixed to an amount of intake air smaller than the predetermined second amount of intake air (ITWS) for a predetermined period (TP) when the engine speed exceeds the target idle speed, and then performs the feedback control based on the first amount of intake air (ITWA).

The present invention according to a second aspect thereof, in addition to the first aspect, is characterized in that the first amount of intake air (ITWA) and the second amount of intake air (ITWS) decrease in proportional to an increase of the water temperature or the oil temperature of the engine (22).

The present invention according to a third aspect thereof, in addition to one of the first and second aspects, is characterized in that the control unit (122) determines whether or not conditions of execution of the feedback control are satisfied, and executes the feedback control when the conditions of execution of the feedback control are satisfied.

The present invention according to a fourth aspect thereof, in addition to the third aspect, is characterized in that the control unit (122) is operable to determine that the conditions of execution of the feedback control are satisfied when a transmission (112) connected to the engine (22) is in a neutral state, a throttle grip which is operated to increase the engine speed is not operated, and the engine speed and the opening of the intake air flow control valve (57) are within an idle feedback control region.

The present invention according to a fifth aspect thereof, in addition to the fourth aspect, is characterized in that the control unit (122) is operable to further determine that when the engine speed and the opening of the intake air flow control valve (57) of the previous time are within the idle feedback control region, the engine speed of current time does not exceed a first speed and that when the opening of the intake air flow control valve (57) of the current time does not exceed a maximum opening, the state is within the idle feedback control region, and to determine that when the engine speed and the opening of the intake air flow control valve (57) of the previous time are not within the idle feedback control region, the current engine speed does not exceed a second speed smaller than the first speed and that when the opening of the intake air flow control valve (57) of current time does not exceed a lower limit opening smaller than the maximum opening, the state is within the idle feedback control region.

The present invention according to a sixth aspect thereof, in addition to one of the first through fifth aspects, is characterized in that the control unit (122) is operable to confine the opening of the intake air flow control valve (57) so that the amount of intake air becomes the upper limit value when the amount of intake air taken by the engine (22) is becomes larger than the upper limit value, and to confine the opening of the intake air flow control valve (57) so that the amount of intake air becomes the lower limit value when the amount of intake air taken by the engine (22) becomes smaller than the lower limit value.

Advantages of the Invention

According to the first aspect of the present invention, the feedback control for controlling the opening of the intake air flow control valve so that the engine speed becomes the target idle speed is executed using the second amount of intake air larger than the first amount of intake air used at the time of idling operation at normal times until the engine speed reaches the target idle speed. Then, after the engine speed has reached the target idle speed, the feedback control is temporarily stopped and the opening of the intake air flow control valve is controlled so that the amount of intake air is reduced according to the water temperature or the oil temperature of the engine using the first amount of intake air irrespective of the engine speed. Subsequently, when the amount of intake air reaches the target value, the feedback control is restarted using the first amount of intake air.

Therefore, the feedback control of the amount of intake air at the time of start of the engine before the engine speed reaches the target idle speed may be performed not based on the time period but based on the engine speed. Accordingly, even when the intake air flow control valve is opened by the operation of the throttle grip during the engine start and the engine speed exceeds the target idle speed, the instantaneous drop of the engine speed may be prevented.

According to the second aspect of the present invention, the value at starting and the value at normal times are reduced in proportional to the increase of the water temperature or the oil temperature of the engine. Therefore, the amount of intake air may be reduced in association with the lowering of the friction of the engine, increase in the amount of intake air in association with the lowering of the friction of the engine may be inhibited, and the engine speed may be controlled adequately.

According to the third and fourth aspects of the present invention, the feedback control is performed when the conditions of execution of the feedback control are satisfied, that is, when the transmission is in the neutral state, the throttle grip is not operated, and the engine speed and the opening of the intake air flow control valve is within the idle feedback control region. Therefore, execution of the feedback control at an adequate timing is achieved.

According to the fifth aspect of the present invention, the determination of whether or not the engine speed and the opening of the intake air flow control valve are within the idle feedback control region may be prevented from changing frequently, and the determination of whether or not the engine speed and the opening of the intake air flow control valve are within the idle feedback control region may be stabilized.

According to the sixth aspect of the present invention, when the amount of intake air is larger than the upper limit value, the amount of intake air is confined to the upper limit value, and when the amount of intake air is smaller than the lower limit value, the amount of intake air is confined to the lower limit. Therefore, the excessive variations of the engine speed are prevented.

For a more complete understanding of the present invention, the reader is referred to the following detailed description section, which should be read in conjunction with the accompanying drawings. Throughout the following detailed description and in the drawings, like numbers refer to like parts.

DETAILED DESCRIPTION OF ILLUSTRATIVE EMBODIMENTS

An embodiment of the present invention will now be described, with reference to the drawings. Throughout this description, relative terms like "upper", "lower", "above", "below", "front", "back", and the like are used in reference to a vantage point of an operator of the vehicle, seated on the driver's seat and facing forward. It should be understood that these terms are used for purposes of illustration, and are not intended to limit the invention.

Referring now to the attached drawings, an engine control apparatus according to the invention will be described in detail below with reference to an illustrative embodiment.

Figure 1:
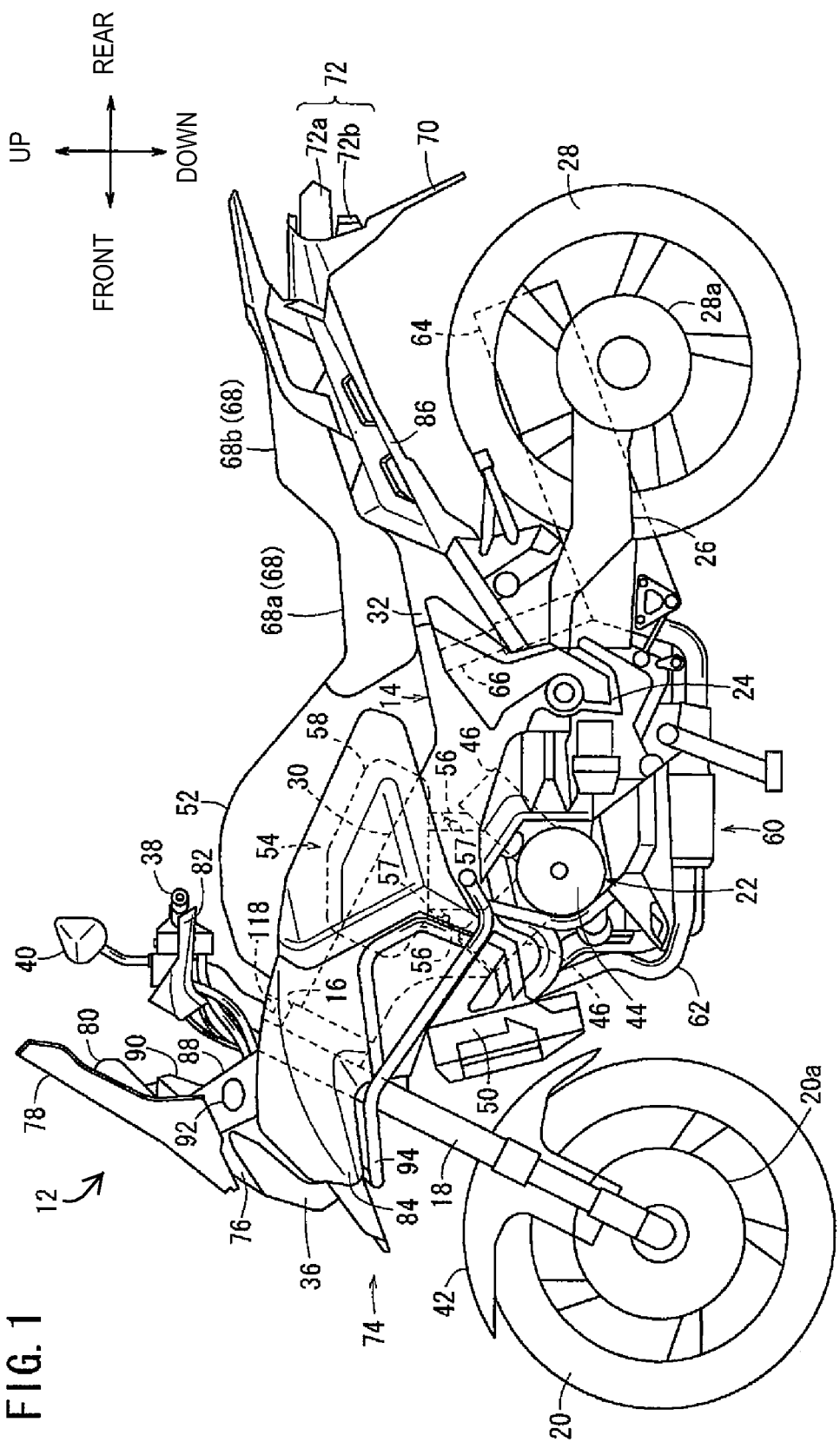
FIG. 1 is a schematic left side view of a saddle-type motorcycle having an engine control apparatus according to an illustrative embodiment of the present invention.

FIG. 1 is a schematic left side view of a saddle-type motorcycle (hereinafter, referred to as "motorcycle") 12 having an engine control apparatus according to the illustrative embodiment of the present invention. For the facilitation of easy understanding of the invention, the fore-and-aft direction and the up and down directions are described with reference to the direction indicated by arrows in FIG. 1 unless otherwise specified, and the left and right directions are described with reference to a direction of view from an operator seated on a vehicle body during operation of the vehicle.

The motorcycle 12 includes a vehicle body frame 14 which configures the vehicle body, a pair of left and right front forks 18 provided at a front end portion of the vehicle body frame 14 and axially rotatably supported by a head pipe 16, a front wheel (steer wheel) 20 mounted on the front forks 18, an engine 22 as a drive source of the motorcycle 12 supported by the vehicle body frame 14, a swing arm 26 pivotally supported by a pivot portion 24 on a lower portion of the vehicle body frame, and a rear wheel (drive wheel) 28 mounted on a rear end portion of the swing arm 26.

The vehicle body frame 14 is formed, for example, of a tube frame of an aluminum casting having a high-rigidity. The vehicle body frame 14 includes a pair of main frames 30 extending obliquely downward from the head pipe 16, the pivot portion 24 in conjunction with a rear portion of the main frames 30 and extending downward, and a pair of left and right seat frames 32 mounted on a rear portion of the main frames 30 and extending obliquely upward and rearward.

A headlight 36 configured to illuminate the front of the vehicle body is arranged in front of the head pipe 16. A handle 38 which is configured to be capable of steering the front wheel 20 is mounted on the top of the head pipe 16 and a pair of left and right back mirrors 40 are mounted on the handle 38. The handle 38 is provided with a throttle handle/accelerator (not shown), which gives an instruction to accelerate the motorcycle 12 (increase in engine speed IACNE), on the right side thereof The front wheel 20 is axially rotatably supported at lower end portions of the front forks 18, and a brake device (disk brake) 20a which provides a braking force on the front wheel is mounted on a side surface thereof. A front fender 42 configured to cover the front wheel 20 from above is also mounted on the lower end portions of the front forks 18.

The engine 22 is, for example, a water-cooled four-stroke V-type four-cylinder engine, and the engine 22 includes a crankcase 44 arranged on a lower end portion thereof and four cylinders (air cylinders) 46, 46, 46, 46. Two cylinders 46, 46 out of the four cylinders 46, 46, 46, 46 extend obliquely upward and forward from the crankcase 44 toward the left and right, and the remaining two cylinders 46, 46 extend obliquely upward and rearward toward the left and right on the rear thereof. An intermediate portion of the engine 22 placed between the cylinders 46, 46 extending obliquely forward and the cylinders 46, 46 extending obliquely rearward is fixedly supported by the main frames 30, and a rear portion thereof is fixedly supported by the pivot portion 24, whereby the posture of the engine 22 is fixed.

An ignition plug/ignition device (not shown) configured to perform ignition, and a piston (not shown) are arranged in the interior of each of the cylinders 46, 46, 46, 46. In contrast, a crankshaft to be coupled to the piston via a connecting rod is axially supported in the interior of the crankcase 44 (not shown). A rotary drive force of the engine 22 is transmitted by a driveshaft (not shown) extending rearward from the crankcase 44, and transmitted to the rear wheel 28 via the driveshaft.

A radiator 50 configured to discharge heat from the engine 22 is disposed in front of the engine 22. In addition, a fuel tank 52 and an intake system 54 are mounted above the engine 22. The intake system 54 is provided with intake air ducts 56, 56, 56, 56 connected to the respective cylinders 46, 46, 46, 46, and an air cleaner 58 connected to the intake air ducts 56, 56, 56, 56. The intake air duct 56 is provided with throttle valves (intake air flow control valve) 57, 57, 57, 57 configured to adjust the amount of air to be supplied to the cylinders 46, 46, 46, 46. The opening of throttle valves 57, 57, 57, 57 is adjusted by a TBW (throttle-by-wire) system. The intake system 54 removes dust or the like in the intake air by the air cleaner 58, and supplies the air to the cylinders 46, 46, 46, 46 via the intake air ducts 56, 56, 56, 56.

In contrast, an exhaust system 60 is provided on the lower portion of the engine 22. The exhaust system 60 includes an exhaust tube 62 connected respectively to the cylinders 46, 46, 46, 46 and extending rearward so as to be routed around the lower portion of the crankcase 44 and an exhaust muffler 64 communicating with the exhaust tube 62 and arranged on the right side of the rear wheel 28. The exhaust system has a function of exhausting exhaust gas from the engine 22.

The swing arm 26 extends from the pivot portion 24 substantially horizontally toward the rear, and the rear wheel 28 is axially rotatably supported at a rear end portion thereof. A brake device (disc brake) 28a configured to provide the rear wheel 28 with a braking force is mounted on a side surface of the rear wheel 28. A rear shock absorber 66 configured to resiliently connect the main frames 30 and the swing arm 26 is mounted on an upper portion of the swing arm 26. The rear shock absorber 66 has a function of absorbing vibrations generated when the motorcycle 12 is traveling.

In contrast, a seat 68 configured to allow passengers (an operator and a fellow passenger) to be seated hereon is disposed on the seat frames 32. The seat 68 employed here is so-called a tandem-type seat including a front seat 68a which allows the operator to be seated thereon, and a rear seat 68b which allows the fellow passenger to be seated on the rear of the front seat 68a. A rear fender 70 is mounted on a rear portion of the seat frames 32 so as to extend rearward and then extend obliquely downward from a lower side of the rear portion thereof. The rear fender 70 includes a tail lamp unit 72 mounted thereon. The tail lamp unit 72 is provided with a brake lamp 72a and a rear side winker lamp 72b disposed thereon.

A vehicle body cover 74 which constitutes a design (appearance) of the vehicle body in the fore-and-aft direction of the vehicle body is mounted on the motorcycle 12. The vehicle body cover 74 includes a headlight cover 76 configured to cover the periphery of the headlight 36, a screen support cover 80 configured to support the screen 78 above the headlight 36, a handle cover 82 configured to cover the front of the handle 38, a pair of left and right side cowls 84 extending rearward from both side surfaces of the headlight 36, and a rear cowl 86 extending rearward and upward together with the seat frames 32 and configured to cover both side surfaces of the seat frames 32.

The vehicle body cover 74 includes a cowl support stay 88 configured to support the headlight 36 and the screen support cover 80, and the cowl support stay 88 is fixed to a front portion of the main frames 30. The cowl support stay 88 supports a meter unit 90 disposed on the back side of the headlight 36 and includes front side winker lamps 92 mounted on both side surfaces thereof. Cowl guard pipes 94 extend forward respectively around the side cowls 84 from side surfaces of the pair of left and right main frames 30, and are connected to a lower portion of the headlight cover 76.

Figure 2:
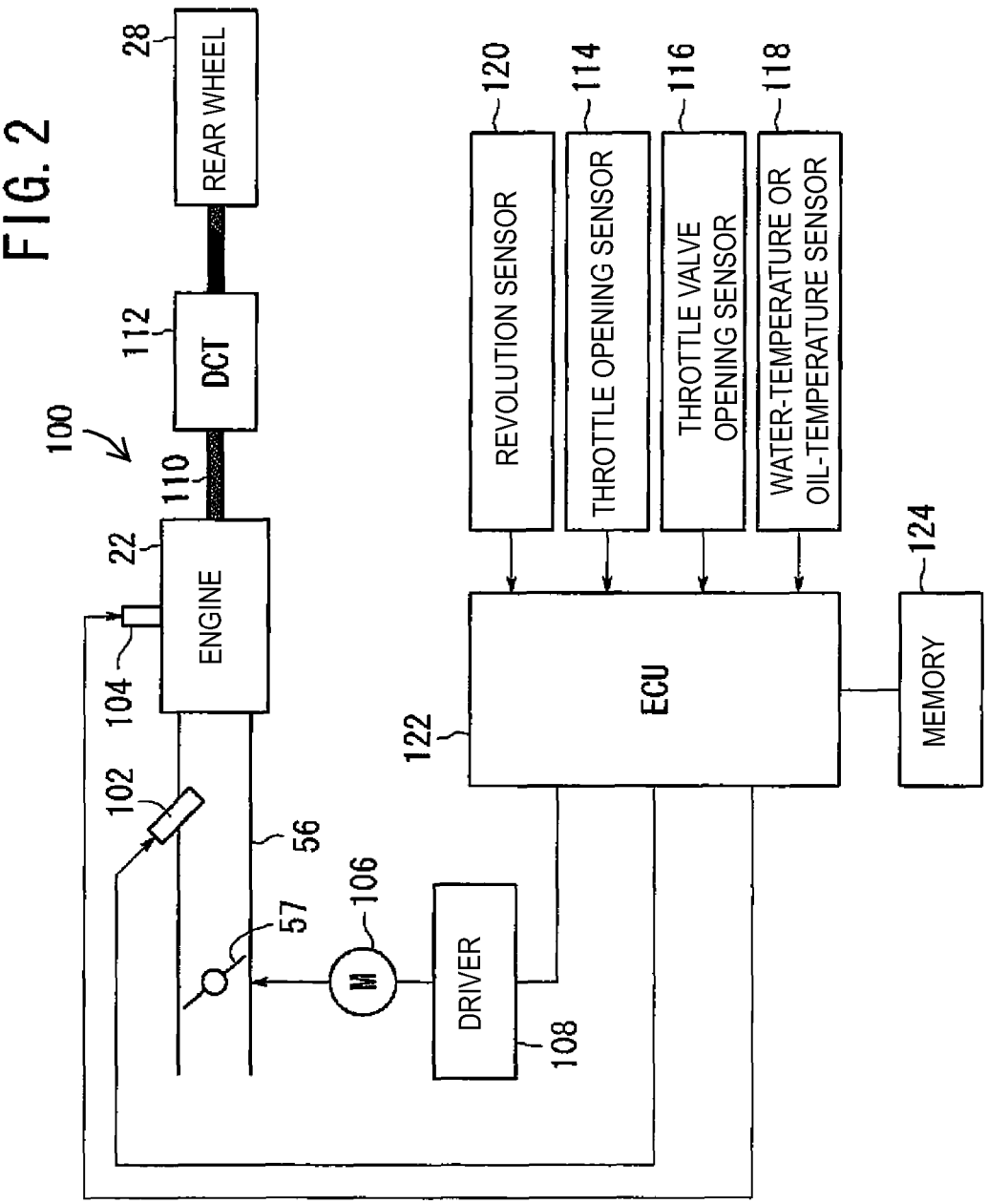
FIG. 2 is a schematic configuration drawing of the engine control apparatus.

FIG. 2 is a schematic configuration drawing of an engine control apparatus 100 mounted on the motorcycle 12 of Throttle-By-Wire system. In FIG. 2, a V-type four-cylinder engine 22 is schematically illustrated. The throttle valve 57 provided in the intake air duct 56 adjusts the amount of intake air ICMD to be taken into each cylinder 46 of the engine 22.

The intake air duct 56 is provided with an injector (fuel ejecting apparatus) 102 which generates air-fuel mixture by ejecting fuel into air flowing into a fuel chamber (not shown) of the each cylinder 46 of the engine 22 via the throttle valve 57, and the cylinder 46 of the engine 22 is provided with an ignition plug 104 configured to ignite the air-fuel mixture flowed therein. The air-fuel mixture in the combustion chamber of the each cylinder 46 is burned by being ignited by the ignition plug 104, whereby the engine 22 converts the fuel energy to a motive power.

A motor 106 is configured to adjust a throttle opening TH of the throttle valve 57 and is driven by a driver 108. A crankshaft 110 as an output shaft of the engine 22 is connected to the rear wheel 28 via a DCT (Dual Clutch Transmission) 112. The DCT (transmission) 112 is configured to shift the gear for the motive power to be transmitted to the rear wheel 28.

More specifically, the DCT 112 is a transmission configured to shift between an odd-numbered gear set (for example, first gear, third gear, fifth gear) and an even-numbered gear set (for example, second gear, fourth gear, sixth gear) with two clutches, and is capable of shifting the gear instantaneously by changing the connections to the two clutches alternately. For example, when the gear position which is currently connected is the third gear, the second gear or the fourth gear is in a waiting state, and hence the gear may be shifted instantaneously by switching the clutch from one to the other. By changing the gear to be connected, the transmission gear ratio of the DCT 112 is changed. The transmission gear ratio of the first gear is the highest, and the transmission gear ratio of the sixth gear is the lowest.

The engine control apparatus 100 includes a throttle opening sensor (throttle opening detecting unit) 114 configured to detect the opening of a throttle grip /accelerator grip (not shown) provided on the handle 38 of the motorcycle 12; a throttle valve opening sensor (throttle valve opening detecting unit) 116 configured to detect the opening TH of the throttle valve 57 (throttle opening); a water-temperature or oil-temperature sensor (water temperature detecting unit or oil temperature detecting unit) 118 configured to detect a temperature (water temperature or oil temperature) TW of coolant or lubricant (not shown) of the engine 22; and an engine speed sensor (engine speed sensor) 120 configured to detect the speed of the crankshaft 110 of the engine 22 (the engine speed) IACNE. Signals detected by the throttle opening sensor 114, the throttle valve opening sensor 116, the water-temperature or oil-temperature sensor 118, and the engine speed sensor 120 are transmitted to an ECU (control unit) 122. These various types of sensors perform the detection at predetermined cycles.

The ECU 122 controls the each throttle opening TH and the amount of fuel ejection or the timing of ejection of the each injector 102, and simultaneously, controls the timing of ignition of the each ignition plug 104 based on the detection signals detected by the various sensors described above, thereby controlling the engine speed IACNE of the engine 22. The ECU 122 controls the throttle opening TH according to the opening of the throttle grip.

In particular, the ECU 122 executes an idle feedback control, which performs feedback control of the throttle valve 57 so that the engine speed IACNE becomes a target idle speed NOBJ when the operation of the throttle grip is not performed (when the opening of the throttle grip is zero), that is, in an idling state. When the conditions of execution of the idle feedback control are not satisfied, the ECU 122 executes idle control, which controls the throttle valve 57 to reduce an amount of intake air ICMD according to the water temperature or the oil temperature of the engine 22 when the engine speed IACNE reaches the target idle speed NOBJ in the idling state. The ECU 122 further performs idle failsafe control and idle start control, which control the throttle valve 57 so that the amount of intake air ICMD is reduced according to the water temperature or the oil temperature of the engine 22 while the engine 22 is in a cranking state when the respective sensors are abnormal.

A memory 124 stores programs and data (value at starting ITWS, value at normal times ITWA, and the like) required for the control performed by the ECU 122, and is used as a working memory of the ECU 122. The memory 124 also stores a lower limit value table in which a lower limit value ICMDLML of the amount of intake air ICMD according to the water temperature or the oil temperature TW and an upper limit value table in which an upper limit value ICMDLMH of the amount of intake air ICMD according to the water temperature or the oil temperature TW.

Now, the operation of the engine control apparatus 100 will be described according to flowcharts shown in FIG. 3 and FIG. 4.

Figure 3:
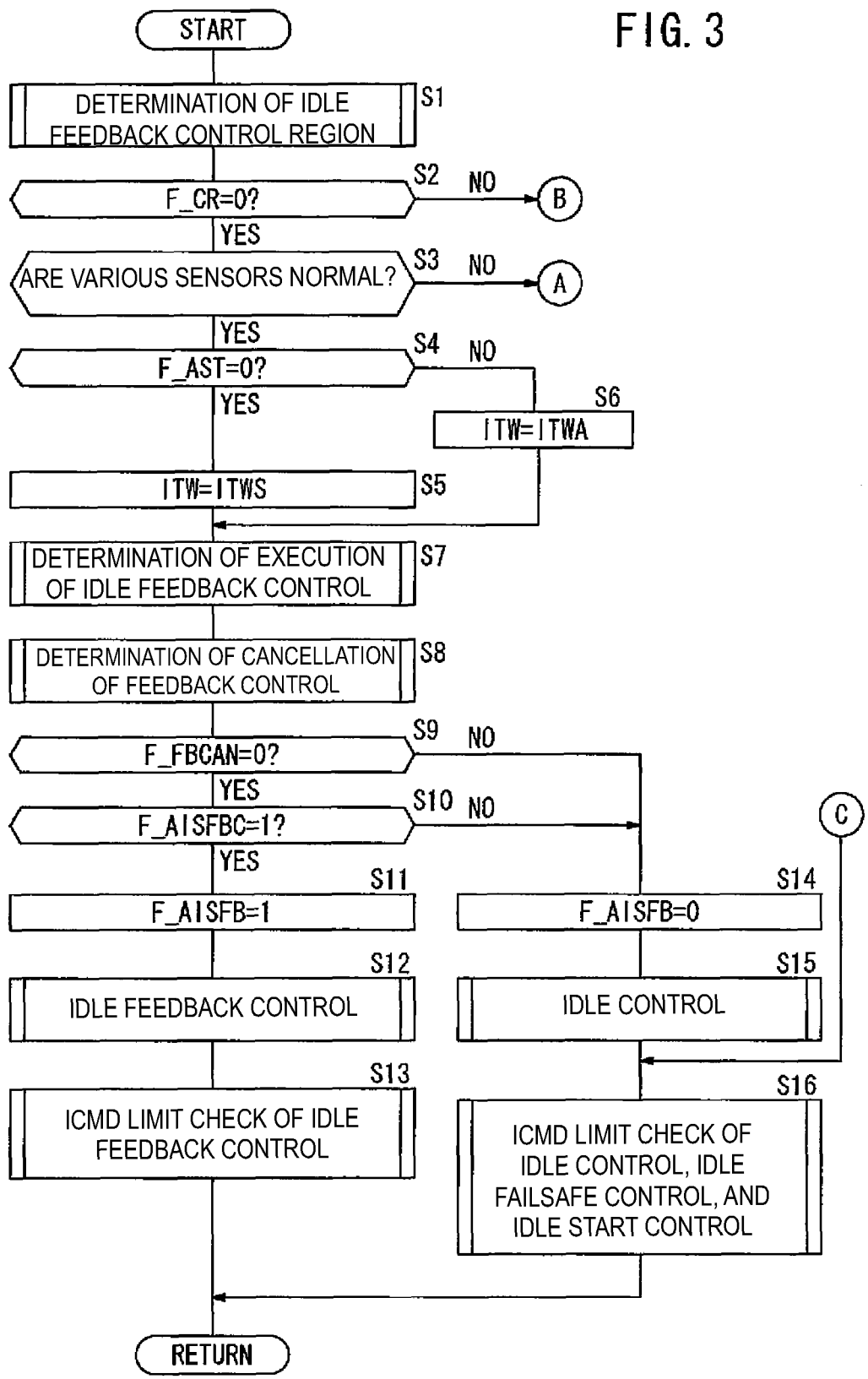
FIG. 3 is a flowchart showing the operation of the engine control apparatus.
Figure 4:
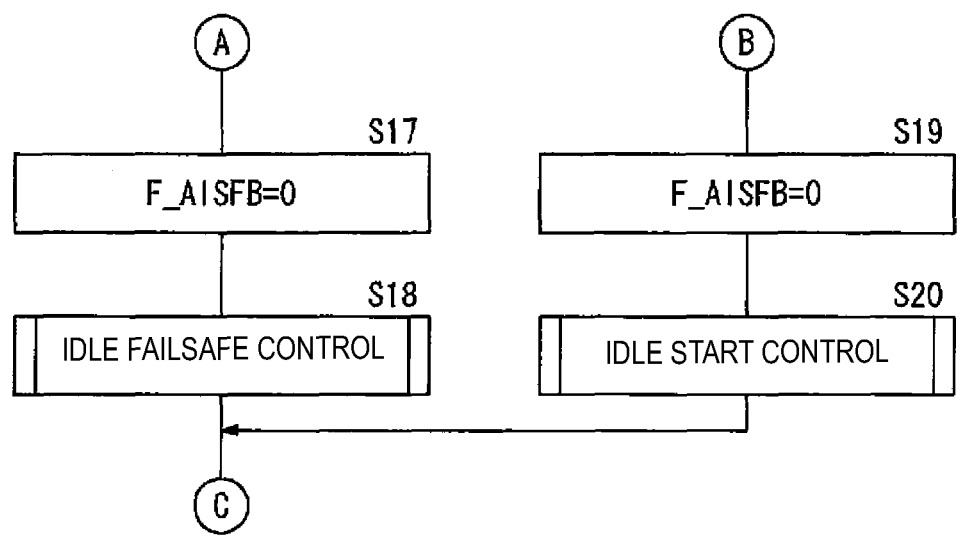
FIG. 4 is an additional flowchart showing an operation of the engine control apparatus shown in FIG. 3.

When the engine 22 is started, the ECU 122 executes the operation shown in the flowcharts in FIG. 3 and FIG. 4 at a certain cycle. The certain cycle has a length longer than the predetermined cycle.

In Step S1 in FIG. 3, the ECU 122 performs determination of an idle feedback control region. The determination of the idle feedback control region is a determination of whether or not the current state of operation of the motorcycle 12 is within an idle feedback control region, which is a region in which the idle feedback control may be executed. The determination of the idle feedback control region will be described later in detail.

Subsequently, the ECU 122 determines whether or not a flag F_CR is zero. The flag F_CR is a flag which indicates whether the cranking is currently performed. When the cranking is currently performed (from the start of the engine 22 until the start of an autonomous operation), the flag F_CR becomes one. The value of the flag F_CR is stored in the memory 124, and when the ECU 122 determines that the cranking is currently performed, the ECU 122 changes the flag F_CR to one. The cranking operation is performed by a starter motor (not shown). When the engine speed IACNE is increased to a value larger than the speed of cranking, the ECU 122 changes the value of the flag F_CR to zero.

When the ECU 122 determines that the cranking is not currently performed in Step S2, the ECU 122 determines whether or not the various sensors such as the throttle opening sensor 114, the throttle valve opening sensor 116, the water-temperature or oil-temperature sensor 118, and the engine speed sensor 120 are normal (Step S3).

When the ECU 122 determines that the various sensors are normal in Step S3, the ECU 122 determines whether or not a flag F_AST is zero (Step S4). The flag F_AST is a flag which indicates whether the idle feedback control is performed in a normal mode or in an after-engine-start mode. The flag F_AST indicates one in the normal mode, and the flag F_AST indicates zero in the after-engine-start mode. The value of the flag F_AST is stored in the memory 124, set to zero as a default value. When the engine speed IACNE reaches the target idle speed NOBJ after the engine 22 is started, the ECU 122 changes the flag F_AST from zero to one. The engine speed IACNE is detected by the engine speed sensor 120. The normal mode is a mode in which the idle feedback control is performed after the completion of the worm-up operation, and the after-engine-start mode is a mode in which the idle feedback control is performed during the worm-up operation.

When the ECU 122 determines that the flag F_AST is zero in Step S4, a basic supply value ITW of the amount of intake air ICMD is set to a value at starting ITWS (Step S5) and the procedure goes to Step S7. In contrast, when the ECU 122 determines that the flag F_AST is 1 in Step S4, the basic supply value ITW is set to a value at normal times ITWA (Step S6) and the procedure goes to Step S7 as is. The amount of intake air ICMD is obtained based on the basic supply value ITW. The value at normal times ITWA is a value smaller than the value at starting ITWS, and the value at normal times ITWA and the value at starting ITWS are values which are decreased gradually in proportion to an increase in the water temperature or the oil temperature TW. In other words, when the water temperature or the oil temperature TW is the same value, the value at starting ITWS becomes larger than the value at normal times ITWA.

In the case of the after-engine-start mode, the basic supply value ITW is set to the value at starting ITWS larger than the value at normal times ITWA, so that the amount of intake air ICMD becomes larger than that in the normal mode. In the after-engine-start mode, since the temperature of the lubricant is low and hence the viscous resistance (friction) is high, the engine speed IACNE becomes unstable and hence an engine stall may occur. However, since the amount of intake air ICMD is large, such an adverse effect may be prevented and, at the same time, the water temperature or the oil temperature TW increases quickly, and the engine speed IACNE may be brought closer to the target idle speed NOBJ quickly.

When the procedure goes to Step S7, the ECU 122 performs the determination of execution of the idle feedback control which determines whether or not the conditions of execution of the idle feedback control are satisfied. The ECU 122 sets a flag F_AISFBC to one when the conditions of execution of the idle feedback control are determined to be satisfied based on the determination of execution of the idle feedback control, and sets the flag F_AISFBC to zero when the conditions of execution of the idle feedback control are not determined to be satisfied. The value of the flag F_AISFBC is stored in the memory 124. The determination of execution of the idle feedback control will be described later in detail.

Subsequently, the ECU 122 performs determination of cancellation of the feedback control which determines whether or not the idle feedback control is to be cancelled (stopped) temporarily (Step S8). The ECU 122 sets a flag F_FBCAN to 1 when the idle feedback control is determined to be cancelled temporarily based on the determination of cancellation of the feedback control, and sets the flag F_FBCAN to zero when the idle feedback control is determined not to be cancelled temporarily, that is, when the idle feedback control is determined to be continued. The value of the flag F_FBCAN is stored in the memory 124.

Regarding the determination of cancellation of the feedback control, which will be described later in detail and will be described here in brief, when the state is changed from the warming-up state to the non-warming-up state, that is, when the idle feedback control is switched from the after-engine-start mode to the normal mode (when the flag F_AST is changed from zero to one), it is determined to cancel the idle feedback control temporarily until the amount of intake air ICMD is decreased to a target value, and the flag F_FBCAN is set to one. The ECU 122 functions as a temperature sensor configured to detect the warm-up state.

Subsequently, the ECU 122 determines whether or not the flag F_FBCAN is zero (Step S9). As described above, the flag F_FBCAN is a flag which indicates whether the idle feedback control is cancelled temporarily. When canceling the idle feedback control temporarily, the flag F_FBCAN becomes one.

When the ECU 122 determines that the flag F_FBCAN is zero in Step S9, the ECU 122 determines whether or not the flag F_AISFBC is one (Step S10). As described above, the flag F_AISFBC is a flag which indicates whether or not the conditions of execution of the idle feedback control is satisfied. When the conditions of execution of the idle feedback control are satisfied, the flag F_AISFBC becomes one.

When the ECU 122 determines that the flag F_AISFBC is one in Step S10, the ECU 122 determines to execute the idle feedback control, and sets the flag F_AISFB to one (Step S11). The flag F_AISFB is a flag which indicates that the idle feedback control is to be executed, and when executing the idle feedback control, the flag F_AISFB becomes one. The value of the flag F_AISFB is stored in the memory 124.

Subsequently, the ECU 122 executes the idle feedback control (Step S12). By the execution of the idle feedback control, the amount of intake air ICMD which makes the engine speed IACNE to be the target idle speed NOBJ is determined. The idle feedback control will be described later in detail.

Subsequently, the ECU 122 performs an ICMD limit check of the idle feedback control (Step S13). In Step S13, the limit check of the amount of intake air ICMD determined by the idle feedback control is performed. When the amount of intake air ICMD exceeds the upper limit value ICMDLMH, or when the amount of intake air ICMD does not reach the lower limit value ICMDLML, the amount of intake air ICMD is confined. The ICMD limit check of the idle feedback control in Step 13 will be described later in detail. The ECU 122 controls the throttle opening TH by controlling the driver 108 based on the amount of intake air ICMD after the ICMD limit check.

In contrast, when the flag F_FBCAN is determined to be one (the idle feedback control is to be cancelled temporarily) in Step S9 and when the flag F_AISFBC is determined to be zero (the conditions of execution of the idle feedback control are not satisfied) in Step S10, the ECU 122 determines not to execute the idle feedback control, and sets a flag F_AISFB to zero (Step S14).

Subsequently, the ECU 122 performs the idle control (Step S15). With the idle control, the amount of intake air ICMD is determined so as to be reduced according to the water temperature or the oil temperature TW. The idle control will be described later in detail.

Subsequently, the ECU 122 performs an ICMD limit check for the idle control, the idle failsafe control, and the idle start control (Step S16). In Step S16, the limit check of the amount of intake air ICMD determined by the idle control, the idle failsafe control, and the idle start control is performed. When the amount of intake air ICMD exceeds the upper limit value ICMDLMH, or when the amount of intake air ICMD does not reach the lower limit value ICMDLML, the amount of intake air ICMD is confined. The ICMD limit check in Step 16 will be described later in detail. The ECU 122 controls the throttle opening TH by controlling the driver 108 based on the amount of intake air ICMD after the ICMD limit check.

In contrast, when the ECU 122 determines that the various sensors are abnormal in Step S3, the procedure goes to Step S17 in FIG. 4, where the ECU 122 sets the flag F_AISFB to zero and the idle failsafe control is performed (Step S18), and then the procedure goes to Step S16 in FIG. 3. The amount of intake air ICMD is determined by the idle failsafe control. The idle failsafe control will be described later in detail.

In contrast, when the ECU 122 determines that the flag F_CR is one (the cranking is currently performed) in Step S2, the procedure goes to Step S19 in FIG. 4, where the ECU 122 sets the flag F_AISFB to zero and the idle start control is performed (Step S20), and then the procedure goes to Step S16 in FIG. 3. The amount of intake air ICMD during the cranking is determined by the idle start control. The idle start control will be described later in detail.

Subsequently, the operation of the determination of the idle feedback control region will be described according to a sub-flowchart in FIG. 5.

Figure 5:
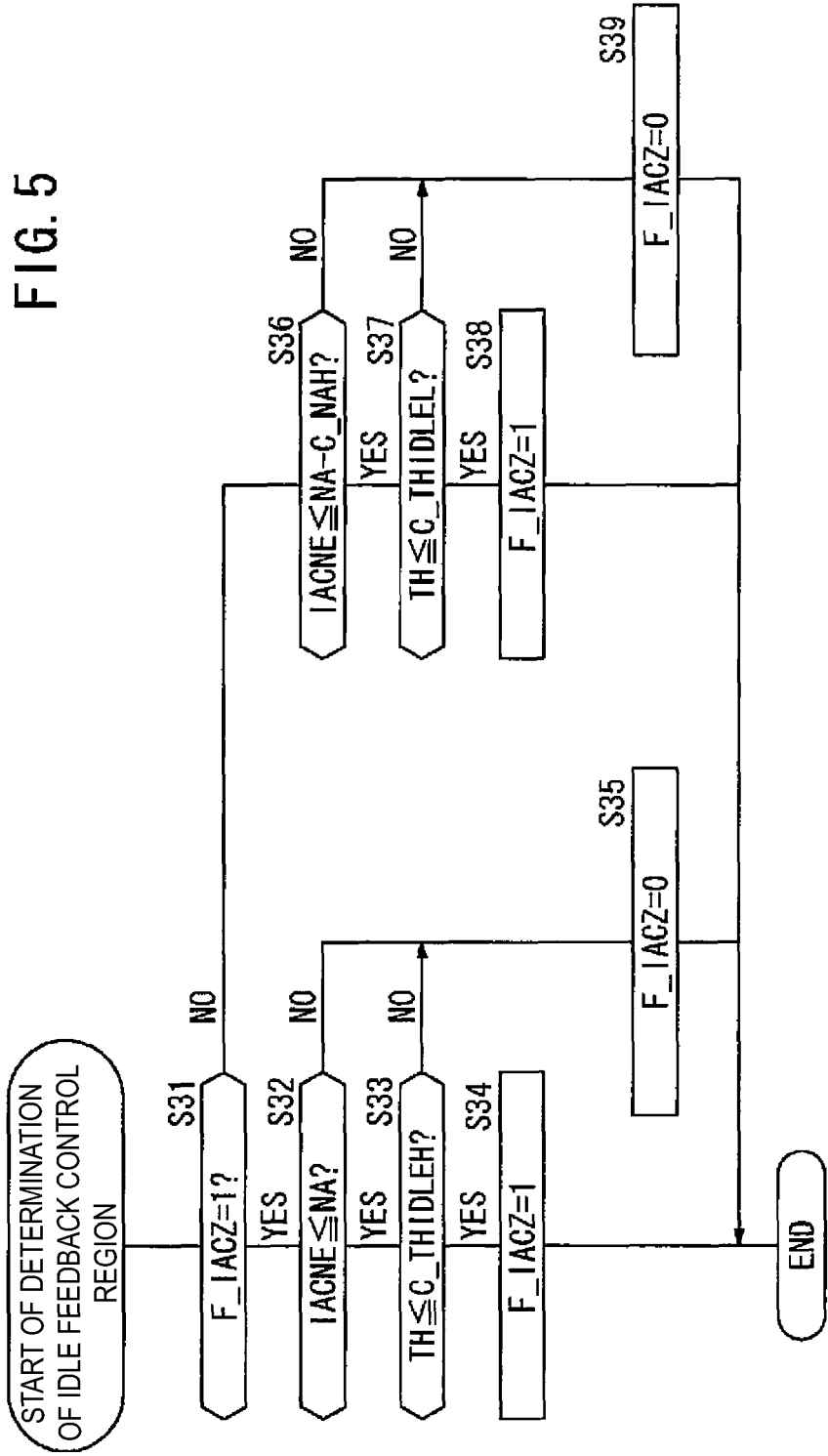
FIG. 5 is a sub-flowchart showing an operation of determination of an idle feedback control region shown in FIG. 3.

When the procedure goes to Step S1 as shown in FIG. 3 and the determination of the idle feedback control region is started, the procedure goes to Step S31 in FIG. 5, where the ECU 122 determines whether or not a flag F_IACZ is one. The flag F_IACZ is a flag which indicates whether or not the operating state of the motorcycle 12 is within the idle feedback control region, and when the operating state of the motorcycle 12 is within the idle feedback control region, the flag F_IACZ becomes one. The value of the flag F_IACZ is stored in the memory 124. In other words, in Step S31, whether or not the operating state of the motorcycle 12 is determined within the idle feedback control region is determined by the previous determination of the idle feedback control region.

When the ECU 122 determines that the flag F_IACZ is one in Step S31, the ECU 122 determines whether or not the engine speed IACNE does not exceed a predetermined speed (first speed) NA (Step S32). The engine speed IACNE is detected by the engine speed sensor 120, and the value of the predetermined speed NA is stored in the memory 124.

When the ECU 122 determines that the engine speed IACNE does not exceed the predetermined speed NA in Step S32, the ECU 122 determines whether or not the throttle opening TH does not exceed an upper limit throttle opening (maximum opening) C_THIDLEH (Step S33). The throttle opening TH is detected by the throttle valve opening sensor 116, and the value of the upper limit throttle opening C_THIDLEH is stored in the memory 124.

When the ECU 122 determines that the throttle opening TH does not exceed the upper limit throttle opening C_THIDLEH in Step S33, the ECU 122 determines that the operating state of the motorcycle 12 is within the idle feedback control region, and sets the flag F_IACZ to one (Step S34).

In contrast, when the ECU 122 determines that the engine speed IACNE exceeds the predetermined speed NA in Step S32, and when the ECU 122 determines that the throttle opening TH exceeds the upper limit throttle opening C_THIDLEH in Step S33, the ECU 122 determines that the operating state of the motorcycle 12 is not within the idle feedback control region, and sets the flag F_IACZ to zero (Step S35).

When the ECU 122 determines that the flag F_IACZ is zero in Step S31, the ECU 122 determines whether or not the engine speed IACNE does not exceed a value obtained by subtracting a hysteresis width C_NAH from the predetermined speed NA (a second speed) (Step S36). The hysteresis width C_NAH is stored in the memory 124.

When the ECU 122 determines that the engine speed IACNE does not exceed the value obtained by subtracting the hysteresis width C_NAH from the predetermined speed NA in Step S36, the ECU 122 determines whether or not the throttle opening TH does not exceed a lower limit throttle opening (lower limit opening) C_THIDLEL (Step S37). The lower limit throttle opening C_THIDLEL is a value smaller than the upper limit throttle opening C_THIDLEH, and is stored in the memory 124.

When the ECU 122 determines that the throttle opening TH does not exceed the lower limit throttle opening C_THIDLEL in Step S37, the ECU 122 determines that the operating state of the motorcycle 12 is within the idle feedback control region, and sets the flag F_IACZ to one (Step S38).

In contrast, when the ECU 122 determines that the engine speed IACNE exceeds the value obtained by subtracting the hysteresis width C_NAH from the predetermined speed NA in Step S36, and the ECU 122 determines that the throttle opening TH exceeds the lower limit throttle opening C_THIDLEL in Step S37, the ECU 122 determines that the operating state of the motorcycle 12 is not within the idle feedback control region, and sets the flag F_IACZ to zero (Step S39).

Figure 6:
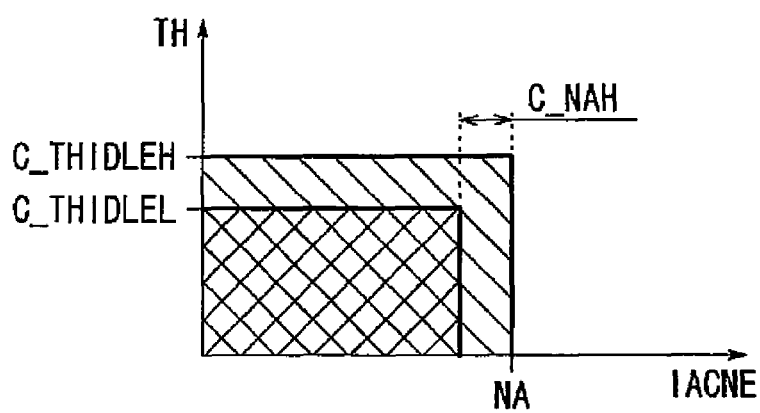
FIG. 6 is a drawing showing the idle feedback control region.

FIG. 6 is a drawing showing the idle feedback control region, and the idle feedback control region is determined by the engine speed IACNE and the throttle opening TH. When the ECU 122 determines that the previous operating state is within the idle feedback control region, the ECU 122 determines whether or not the engine speed IACNE and the throttle opening TH are within an region determined by the predetermined speed NA and the upper limit throttle opening C_THIDLEH (area indicated by diagonal hatch lines and meshed hatch lines). When the ECU 122 determines that the previous operating state is not within the idle feedback control region, the ECU 122 determines whether or not the engine speed IACNE and the throttle opening TH are within an region determined by the predetermined speed NA−(minus) C_NAH and the lower limit throttle opening C_THIDLEL (area indicated by meshed hatch lines). The reason why the hysteresis is provided in the idle feedback control region depending on whether or not the previous operating state is within the idle feedback control region is to prevent the determination of whether or not the current operating state is within the feedback control region changes frequently.

Now, the operation of the determination of execution of the idle feedback control will be described according to a sub-flowchart in FIG. 7.

Figure 7:
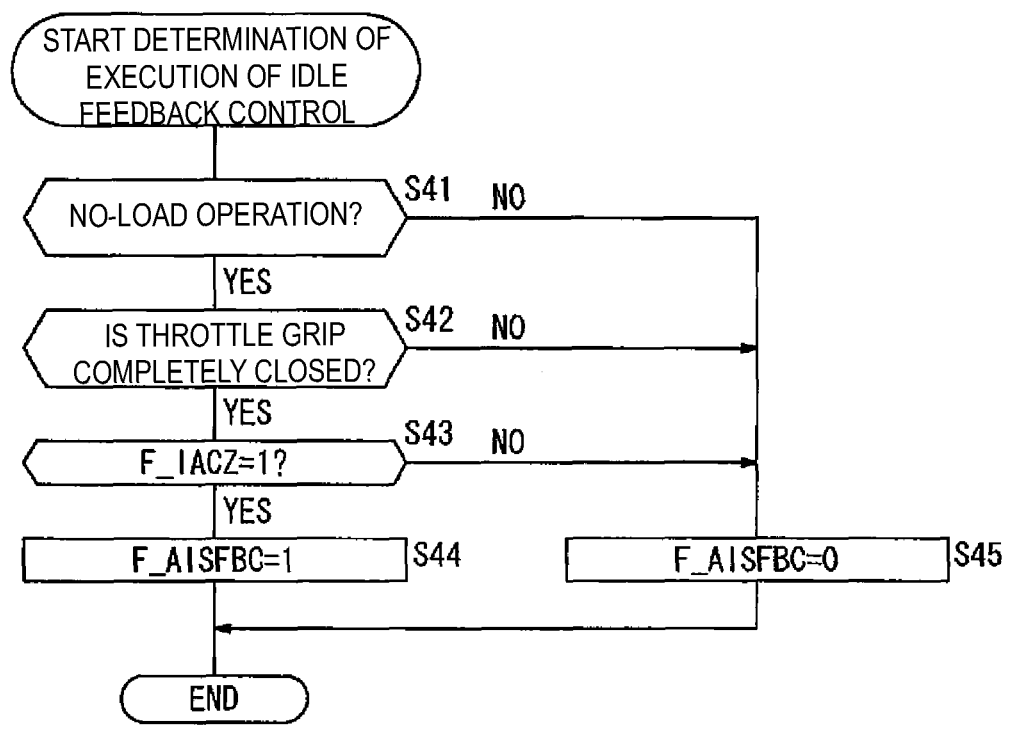
FIG. 7 is a sub-flowchart showing an operation of determination of execution of the idle feedback control shown in FIG. 3.

When the procedure goes to Step S7 in FIG. 3 and the determination of execution of the idle feedback control is started, the procedure goes to Step S41 in FIG. 7, where the ECU 122 determines whether or not the current operating state of the motorcycle 12 is a no-load operation. The no-load operation means a neutral state in which the gear of the DCT 112 is not connected.

When the ECU 122 determines that the current operating state of the motorcycle 12 is the no-load operation in Step S41, the ECU 122 determines whether or not the throttle grip is completely closed (whether or not the throttle grip is operated by the operator) (Step S42). This determination is made based on the detection signal from the throttle opening sensor 114.

When the ECU 122 determines that the throttle grip is completely closed (that the throttle grip is not operated) in Step S42, the ECU 122 determines whether or not the flag F_IACZ is one (Step S43). In other words, the ECU 122 determines whether or not the operating state of the motorcycle 12 is determined within the idle feedback control region is determined by the determination of the idle feedback control region in Step S51.

When the ECU 122 determines that the flag F_IACZ is one in Step S43, the ECU 122 determines that the conditions of execution of the idle feedback control are satisfied, and sets the flag F_AISFBC to one (Step S44).

In contrast, when the ECU 122 determines that the operating state is not the no-load operation (that any gear is connected by the operator) in Step S41, when the ECU 122 determines that the throttle grip is not completely closed in Step S42 (that the throttle grip is operated by the operator), and when the ECU 122 determines that the flag F_IACZ is zero in Step S43, the ECU 122 determines that the conditions of execution of the idle feedback control are not satisfied, and sets the flag F_AISFBC to zero (Step S45). In other words, when the operation to cause the motorcycle 12 to travel is performed by the operator, the ECU 122 sets the flag F_AISFBC to zero. Accordingly, since the procedure goes to NO in Step S10 in FIG. 3, the idle feedback control is cancelled.

Subsequently, the operation of the determination of cancellation of the feedback control will be described according to a sub-flowchart in FIG. 8.

Figure 8:
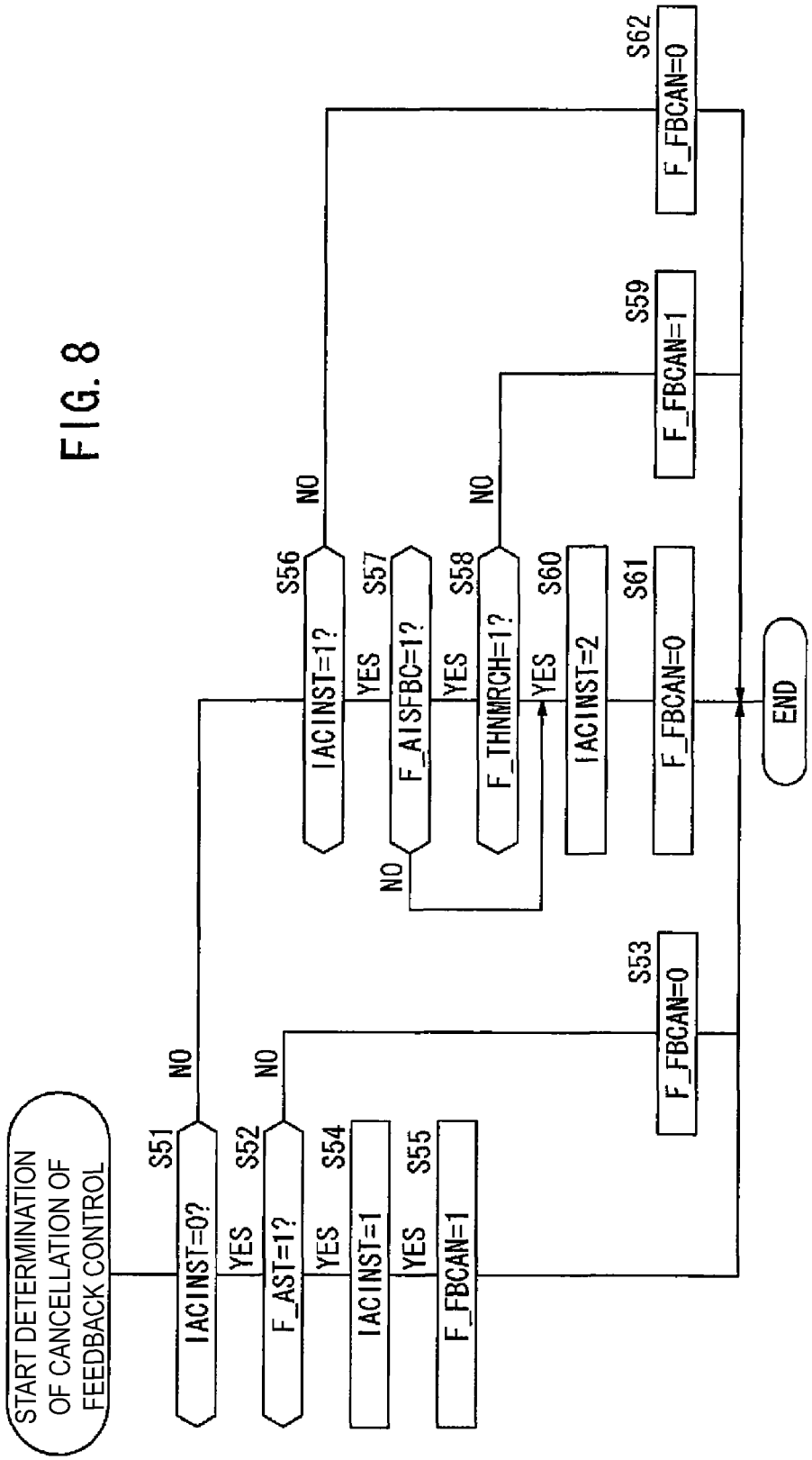
FIG. 8 is a sub-flowchart showing an operation of determination of cancellation of the idle feedback control shown in FIG. 3.

When the procedure goes to Step S8 in FIG. 3, and the determination of cancellation of the feedback control is started, the procedure goes to Step S51 in FIG. 8, where the ECU 122 determines whether or not a cancellation determination state IACINST is zero. The default value of the cancellation determination state IACINST is set to zero. The value of the cancellation determination state IACINST is stored in the memory 124.

When the ECU 122 determines that the cancellation determination state IACINST is zero in Step S51, the ECU 122 determines whether or not the flag F_AST is one (Step S52).

When the ECU 122 determines that the flag F_AST is zero (that the idle feedback control is performed in the after-engine-start mode) in Step S52, the ECU 122 determines that the idle feedback control is not cancelled temporarily and the flag F_FBCAN is set to zero (Step S53). In other words, when the cancellation determination state IACINST is zero and the flag F_AST is zero, the flag F_FBCAN becomes zero. Therefore, the procedure goes to Yes in Step S9 in FIG. 3, and when the flag F_AISFBC is one (Yes in Step S10), the idle feedback control is performed in Step S12. Here, since the ECU 122 changes the flag F_AST from 0 to 1 when the engine speed IACNE is increased to the target idle speed NOBJ or higher, the idle feedback control is continuously performed until the engine speed IACNE becomes the target idle speed NOBJ.

In contrast, when the ECU 122 determines that the flag F_AST is one in Step S52, the procedure goes to Step S54, where the ECU 122 determines to temporarily cancel the idle feedback control, sets the cancellation determination state IACINST to one, and sets the flag F_FBCAN to one (Step S55). In other words, when the cancellation determination state IACINST becomes one, the flag F_FBCAN becomes one, and the procedure goes to No in Step S9 in FIG. 3, so that the idle feedback control is cancelled temporarily and the idle control is performed in Step S15.

When the ECU 122 determines that the cancellation determination state IACINST is not zero in Step S51, the ECU 122 determines whether or not the cancellation determination state IACINST is one (Step S56).

When the ECU 122 determines that the cancellation determination state IACINST is one in Step S56, the ECU 122 determines whether or not the flag F_AISFBC is one (Step S57). In other words, in Step S57, whether or not the conditions of execution of the current feedback control are satisfied is determined.

When the ECU 122 determines that the flag F_AISFBC is one (that the conditions of execution of the feedback control are satisfied) in Step S57, the ECU 122 determines whether or not a flag F_THNMRCH is one (Step S58). The flag F_TH-NMRCH is a flag which indicates that whether or not the amount of intake air ICMD is reduced to a target value by the idle control. When the amount of intake air ICMD is reduced to the target value by the idle control, the ECU 122 changes the flag F_THNMRCH from zero to one. The value of the flag F_THNMRCH is stored in the memory 124, and the initial value is set to zero.

When the ECU 122 determines that the flag F_THNMRCH is not one in Step S58, the ECU 122 changes the flag F_FBCAN to one (Step S59). When the flag F_FBCAN is one, the procedure goes to No in Step S9 in FIG. 3, the idle control is continuously performed in Step S15. In other words, in principle, when the cancellation determination state IACINST is one, the idle control is performed until the amount of intake air ICMD is reduced to the target value.

In contrast, when the ECU 122 determines that the flag F-AISFBC is not one in Step S57, and when the ECU 122 determines that the flag F_THNMRCH is one in Step S58, the ECU 122 sets the cancellation determination state IACINST to two (Step S60), and sets the flag F_FBCAN to zero (Step S61). In other words, when the amount of intake air ICMD reaches the target value, the cancellation determination state IACINST becomes two and the flag F_FBCAN becomes 0. Therefore, the procedure goes to Yes in Step 9 in FIG. 3, and the idle feedback control is restarted in Step S12. When the flag F_AISFBC is not one (when the conditions of execution of the idle feedback control are not satisfied), the cancellation determination state IACINST becomes two, and the flag F_FBCAN becomes zero. However, the procedure goes to No in Step S10 in FIG. 3, and the idle control is performed in Step S15.

When the ECU 122 determines that the cancellation determination state IACINST is not one, but two in Step S56, the ECU 122 sets the flag F_FBCAN to zero (Step S62). When the cancellation determination state IACINST is two, since the flag F_FBCAN becomes zero, the procedure goes to Yes in Step S9 in FIG. 3, and the idle feedback control is performed in Step S12.

In this manner, the ECU 122 determines that the idle feedback control is not to be cancelled temporarily from the start of the engine 22 until the engine speed IACNE reaches the target idle speed NOBJ (flag F_FBCAN=0), determines that the idle feedback control is to be cancelled temporarily from when the engine speed IACNE reaches the target idle speed NOBJ until the amount of intake air ICMD reaches the target value, (flag F_FBCAN=1), and determined that the idle feedback control is not to be cancelled temporarily when the amount of intake air ICMD reaches the target value (flag F_FBCAN=0).

Subsequently, the operation of the idle feedback control will be descried according to flowcharts in FIG. 9 and FIG. 10.

Figure 9:
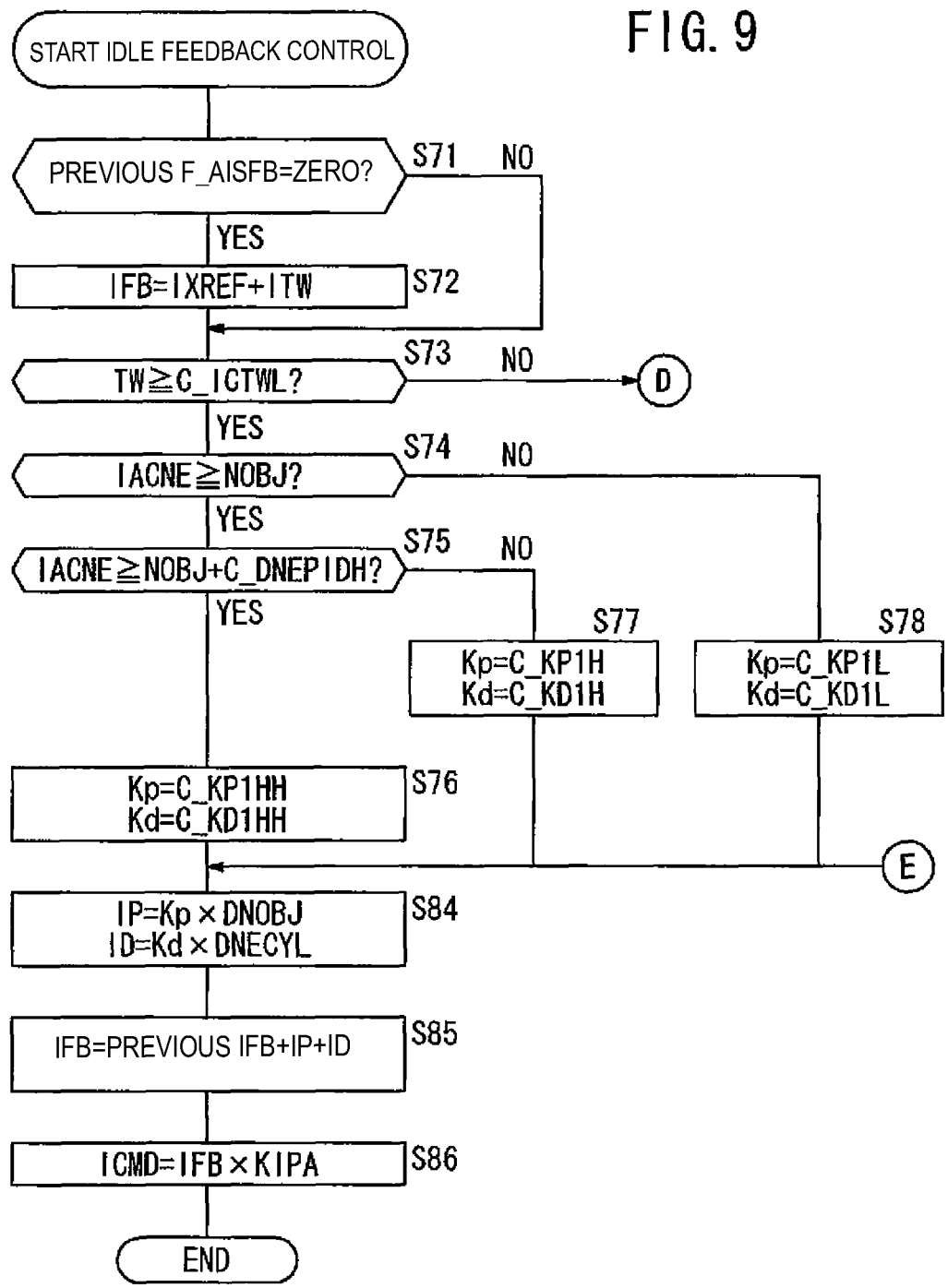
FIG. 9 is a sub-flowchart showing an operation of the idle feedback control shown in FIG. 3.

When the procedure goes to Step S12 in FIG. 3 and the idle feedback control is started, the procedure goes to Step S71 in FIG. 9, and the ECU 122 determines whether or not the previous value of the flag F_AISFB is zero. When the ECU 122 determines that the idle feedback control is not to be executed from the previous operation shown in the flowchart in FIG. 3, the previous flag F_AISFB becomes zero, and when the ECU 122 determines that the idle feedback control is to be executed from the previous operation, the previous flag F_AISFB becomes one.

When the ECU 122 determines that the value of the previous flag F_AISFB is zero in Step S71, the ECU 122 determines that the idle feedback control is to be started and obtains a control value IFB of the idle feedback control from the relational expression of control value IFB=learned value IXREF+basic supply value ITW (Step S72) and the procedure goes to Step S73. Here, the basic supply value ITW becomes a value at starting ITWS when the flag F_AST is zero, and becomes a value at normal times ITWA when the flag F_AST is one. Since the amount of air which is actually taken into the cylinder 46 varies depending on the usage of the engine 22, the learned value IXREF is a leaned value obtained from the amount of air which is actually taken into the cylinder 46 in the past in order to correct the amount of intake air ICMD.

In other words, although the opening of the throttle valve 57 is controlled so as to achieve the amount of intake air ICMD by the usage of the engine 22, the amount of air which is actually taken into the engine 22 does not become the amount of intake air ICMD. Therefore, the amount of intake air ICMD is corrected by the learned value IXREF. The intake air duct 56 is provided with a sensor configured to detect the amount of air which is actually taken therein, although not illustrated.

In contrast, when the ECU 122 determines that the value of the previous flag F_AISFB is one in Step S71, the ECU 122 determines that the idle feedback control is currently continuing, and the procedure goes to Step S73 as is.

When the procedure goes to Step S73, the ECU 122 determines whether or not the water temperature or the oil temperature TW is a predetermined temperature C_ICTWL or higher. The water temperature or the oil temperature TW is detected by a water-temperature or oil-temperature sensor 118, and the value of the predetermined temperature C_ICTWL is stored in the memory 124.

When the ECU 122 determines that the water temperature or the oil temperature TW detected by the water-temperature or oil-temperature sensor 118 is the predetermined temperature C_ICTWL or higher, the ECU 122 determines whether or not the engine speed IACNE is the target idle speed NOBJ or higher (Step S74).

When the ECU 122 determines that the engine speed IACNE is the target idle speed NOBJ or larger in Step S74, the ECU 122 determines whether or not the engine speed IACNE is a value obtained by adding the target idle speed NOBJ and an engine revolutions range at a high temperature C_DNEPIDH or larger (Step S75). The value of the engine revolution range at a high temperature C_DNEPIDH is stored in the memory 124.

When the ECU 122 determines that the engine speed IACNE is a value obtained by adding the target idle speed NOBJ and the engine revolutions range at a high temperature C_DNEPIDH or larger, the ECU 122 sets a P-term multiplication coefficient Kp of a PID control to a predetermined coefficient of first P-term at a high temperature C_KP1HH and a D-term multiplication coefficient Kd to a predetermined coefficient of first D-term at a high temperature C_KD1HH (Step S76), and the procedure goes to Step S84.

In contrast, when the ECU 122 determines that the engine speed IACNE is smaller than the value obtained by adding the target idle speed NOBJ and the engine revolutions range at a high temperature C_DNEPIDH in Step S75, the ECU 122 sets the P-term multiplication coefficient Kp of the PID control to a predetermined coefficient of second P-term at a high temperature C_KP1H and the D-term multiplication coefficient Kd to a predetermined coefficient of second D-term at a high temperature C_KD1H (Step S77), and the procedure goes to Step S84.

When the ECU 122 determines that the engine speed IACNE is smaller than the target idle speed NOBJ in Step S74, the ECU 122 sets the P-term multiplication coefficient Kp of the PID control to a predetermined coefficient of third P-term at a high temperature C_KP1L and the D-term multiplication coefficient Kd to a predetermined coefficient of third D-term at a high temperature C_KD1L (Step S78), and the procedure goes to Step S84.

Values of the coefficient of first P-term at a high temperature C_KP1HH, the second P-term at a high temperature C_KP1H, and the coefficient of third P-term at a high temperature C_KP1L, and values of the coefficient of first D-term at a high temperature C_KD1HH, the coefficient of second D-term at a high temperature C_KD1H, and the coefficient of third D-term at a high temperature C_KD1L are stored in the memory 124.

Figure 10:
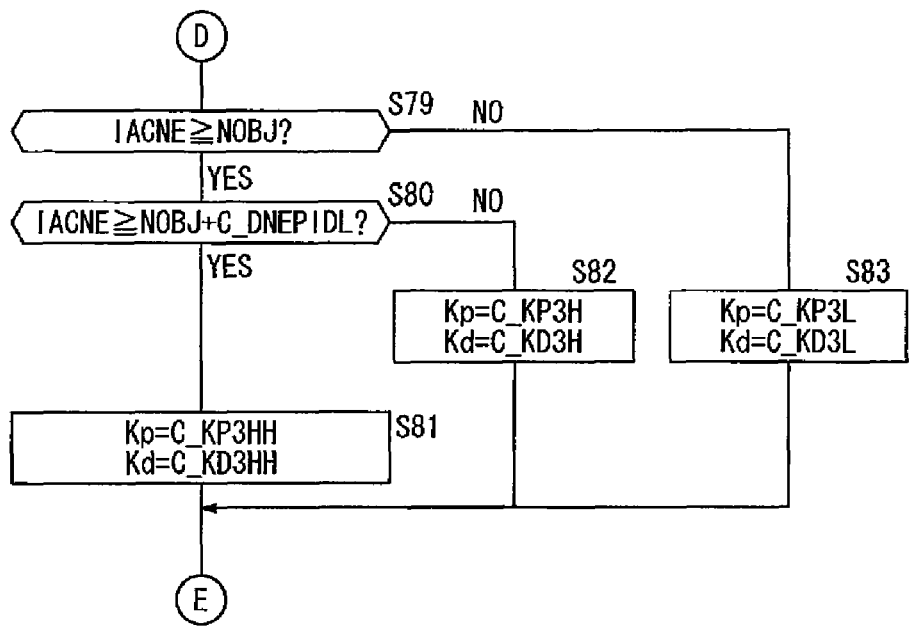
FIG. 10 is a sub-flowchart showing the operation of the idle feedback control shown in FIG. 3.

When the ECU 122 determines that the water temperature or the oil temperature TW does not exceed the predetermined temperature C_ICTWL in Step S73, the procedure goes to Step S79 in FIG. 10, where the ECU 122 determines whether or not the engine speed IACNE is the target idle speed NOBJ or larger.

When the ECU 122 determines that the engine speed IACNE is the target idle speed NOBJ or larger in Step S79, the ECU 122 determines whether or not the engine speed IACNE is a value obtained by adding the target idle speed NOBJ and an engine revolution range at a low temperature C_DNEPIDL or larger (Step S80). The value of the engine revolution range at a low temperature C_DNEPIDL is stored in the memory 124.

When the ECU 122 determines that the engine speed IACNE is a value obtained by adding the target idle speed NOBJ and the engine revolution range at a low temperature C_DNEPIDL or larger in Step S80, the ECU 122 sets the P-term multiplication coefficient Kp of the PID control to a predetermined coefficient of first P-term at a low temperature C_KP3HH and the D-term multiplication coefficient Kd to a predetermined coefficient of first D-term at a low temperature C_KD3HH (Step S81), and the procedure goes to Step S84 in FIG. 9.

In contrast, when the ECU 122 determines that the engine speed IACNE is smaller than a value obtained by adding the target idle speed NOBJ and the engine revolution range at a low temperature C_DNEPIDL in Step S80, the ECU 122 sets the P-term multiplication coefficient Kp of the PID control to a predetermined coefficient of second P-term at a low temperature C_KP3H and the D-term multiplication coefficient Kd to a predetermined coefficient of second D-term at a low temperature C_KD3H (Step S82), and the procedure goes to Step S84 in FIG. 9.

When the ECU 122 determines that the engine speed IACNE is smaller than the target idle speed NOBJ in Step 79, the ECU 122 sets the P-term multiplication coefficient Kp of the PID control to a predetermined coefficient of third P-term at a low temperature C_KP3L and the D-term multiplication coefficient Kd to a predetermined coefficient of third D-term at a low temperature C_KD3L (Step S83), and the procedure goes to Step S84 in FIG. 9.

Values of the coefficient of first P-term at a low temperature C_KP3HH, the coefficient of second P-term at a low temperature C_KP3H, and the coefficient of third P-term at a low temperature C_KP3L and values of the coefficient of first D-term at a low temperature C_KD3HH, the coefficient of second D-term at a low temperature C_KD3H, and the coefficient of third D-term at a low temperature C_KD3L are stored in the memory 124.

When the procedure goes to Step S84, the ECU 122 obtains a value IP of the P-term by multiplying the P-term multiplication coefficient Kp by a value DNOBJ obtained by subtracting the current engine speed IACNE from the target idle speed NOBJ and obtains a value ID of the D-term by multiplying the D-term multiplication coefficient Kd by a value DNECYL obtained by subtracting the current engine speed IACNE from the previous engine speed IACNE.

Subsequently, the ECU 122 adds the value IP and the value ID obtained in Step S84 to the previous control value IFB and obtains a new control value IFB (Step S85), and multiplies the control value IFB obtained newly by an atmospheric pressure compensation coefficient KIPA and obtains the amount of intake air ICMD (Step S86).

In this manner, the idle feedback control is configured to obtain the amount of intake air ICMD so that the engine speed IACNE becomes the target idle speed NOBJ by using the basic supply value ITW. Here, the idle feedback control is a control of the opening of the throttle valve 57 so as to achieve the obtained amount of intake air ICMD, and the control of the opening of the throttle valve 57 is performed after having performed the operation of the ICMD limit check of the idle feedback control. Needless to say, the basic supply value ITW is the value at starting ITWS until the engine speed IACNE reaches the target idle speed NOBJ, and is the value at normal times ITWA after the engine speed IACNE has reached the target idle speed NOBJ.

Now, the operation of the ICMD limit check of the idle feedback control will be described according to a sub-flowchart in FIG. 11.

Figure 11:
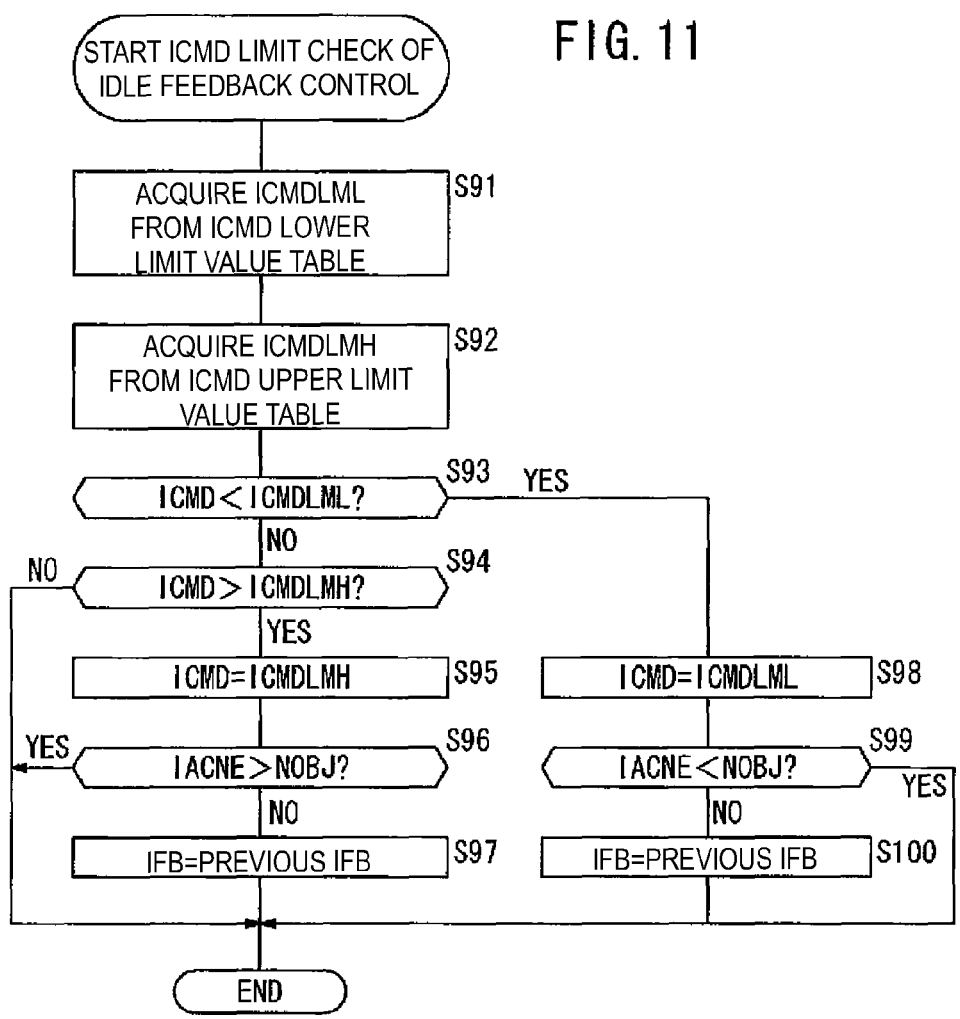
FIG. 11 is a sub-flowchart showing an operation of an ICMD limit check of the idle feedback control shown in FIG. 3.

The procedure goes to Step S13 in FIG. 3, and the ICMD limit check of the idle feedback control is started, the procedure goes to Step S91 in FIG. 11, where the ECU 122 acquires the lower limit value ICMDLML of the amount of intake air ICMD according to the current water temperature or the oil temperature TW from an ICMD lower limit value table stored in the memory 124.

Subsequently, the ECU 122 acquires the upper limit value ICMDLMH of the amount of intake air ICMD according to the current water temperature or the oil temperature TW from an ICMD upper limit value table stored in the memory 124 (Step S92).

Subsequently, the ECU 122 determines whether or not the amount of intake air ICMD obtained by the idle feedback control is smaller than the lower limit value ICMDLML (Step S93).

When the ECU 122 determines that the obtained amount of intake air ICMD is not smaller than the lower limit value ICMDLML in Step S93, the ECU 122 determines whether or not the amount of intake air ICMD is larger than the upper limit value ICMDLMH (Step S94).

When the ECU 122 determines that the obtained amount of intake air ICMD is not larger than the upper limit value ICMDLMH in Step S94, the ECU 122 terminates the ICMD limit check of the idle feedback control, and when the ECU 122 determines that the amount of intake air ICMD is larger than the upper limit value ICMDLMH in Step S94, the ECU 122 sets the amount of intake air ICMD to the upper limit value ICMDLMH (Step S95). In other words, when the amount of intake air ICMD is larger than the upper limit value ICMDLMH, the amount of intake air ICMD is confined to the upper limit value ICMDLMH.

Subsequently, the ECU 122 determines whether or not the engine speed IACNE is larger than the target idle speed NOBJ (Step S96).

When the ECU 122 determines that the engine speed IACNE is larger than the target idle speed NOBJ in Step S96, the ECU 122 terminates the ICMD limit check of the idle feedback control, and when the ECU 122 determines that the engine speed IACNE is not larger than the target idle speed NOBJ in Step S96, the ECU 122 sets the control value IFB to the previous control value IFB (Step S97) and terminates the ICMD limit check of the idle feedback control.

In contrast, when the ECU 122 determines that the amount of intake air ICMD is smaller than the lower limit value ICMDLML in Step S93, the ECU 122 sets the amount of intake air ICMD to the lower limit value ICMDLML (Step S98). In other words, when the amount of intake air ICMD is smaller than the lower limit value ICMDLML, the amount of intake air ICMD is confined to the lower limit value ICMDLML.

Subsequently, the ECU 122 determines whether or not the engine speed IACNE is smaller than the target idle speed NOBJ (Step S99).

When the ECU 122 determines that the engine speed IACNE is smaller than the target idle speed NOBJ in Step S100, the ECU 122 terminates the ICMD limit check operation of the idle feedback control, and when the ECU 122 determines that the engine speed IACNE is not smaller than the target idle speed NOBJ in Step S100, the ECU 122 sets the control value IFB to the previous control value IFB (Step S100) and terminates the limit check operation of the idle feedback control.

The opening of the throttle valve 57 is controlled so as to achieve the amount of intake air ICMD after the limit check operation of the idle feedback control. In this manner, when the amount of intake air ICMD is smaller than, or larger than the predetermined range, the amount of intake air ICMD is confined. Therefore, the excessive variations of the engine speed IACNE are prevented.

Now, the operation of the idle control will be described according to a sub-flowchart in FIG. 12.

Figure 12:
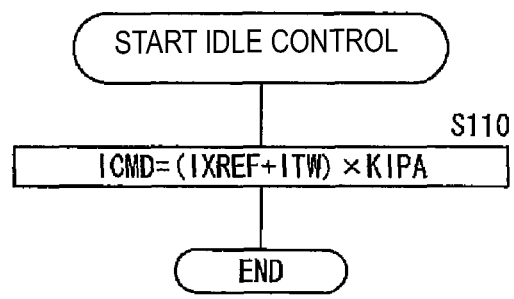
FIG. 12 is a sub-flowchart showing an operation of the idle feedback control shown in FIG. 3.

When the procedure goes to Step S15 in FIG. 3, where the idle control is started, the procedure goes to Step S110 in FIG. 12, and the ECU 122 obtains the amount of intake air ICMD by the relational expression of amount of intake air ICMD=(learned value IXREF+basic supply value ITW) atmospheric pressure compensation coefficient KIPA, and terminates the idle control. Here, the basic supply value ITW is reduced in value as the water temperature or the oil temperature increases. The water temperature or the oil temperature is increased with the elapse of the operating time of the engine 22, and the friction of the engine 22 is also reduced. Therefore, the amount of intake air ICMD obtained by the idle control may be reduced with the elapse of operating time of the engine 22. In this manner, the idle control obtains the amount of intake air ICMD using the basic supply value ITW irrespective of the engine speed IACNE. Here, the idle control controls the opening of the throttle valve 57 so as to achieve the obtained amount of intake air ICMD. However, the opening of the throttle valve 57 is controlled after having performed the operations of the ICMD limit check of the idle control, the idle failsafe control, and the idle start control.

Now, the operation of the idle failsafe control will be described according to a sub-flowchart in FIG. 13.

Figure 13:
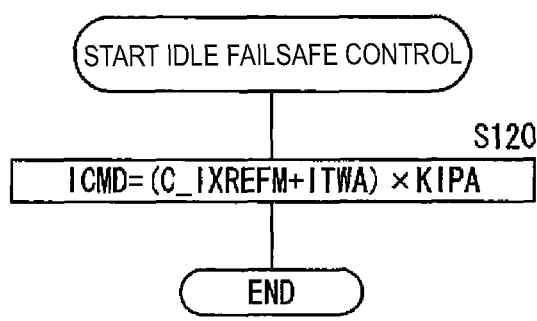
FIG. 13 is a sub-flowchart showing an operation of the idle failsafe control region shown in FIG. 4.

When the procedure goes to Step S18 in FIG. 4, where the idle failsafe control is started, the procedure goes to Step S120 in FIG. 13, and the ECU 122 obtains the amount of intake air ICMD by the relational expression of amount of intake air ICMD=(default value C_IXREFM of learned value IXREF+value at normal times ITWA)×atmospheric pressure compensation coefficient KIPA, and terminates the operation of the idle failsafe control. Here, the value at normal times ITWA is reduced in value as the water temperature or the oil temperature increases. The water temperature or the oil temperature is increased with the elapse of the operating time of the engine 22, and the friction of the engine 22 is also reduced.

Therefore, the amount of intake air ICMD obtained by the idle failsafe control may be reduced with the elapse of operating time of the engine 22.

In this manner, the idle failsafe control obtains the amount of intake air ICMD using the value at normal times ITWA irrespective of the engine speed IACNE. Here, the idle failsafe control controls the opening of the throttle valve 57 so as to achieve the obtained amount of intake air ICMD. However, the opening of the throttle valve 57 is controlled after having performed the operations of the ICMD limit check of the idle control, the idle failsafe control, and the idle start control.

Figure 14:
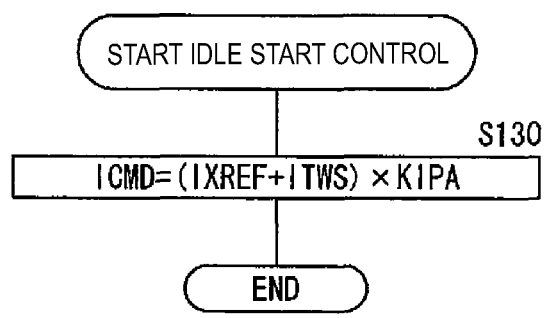
FIG. 14 is a sub-flowchart showing an operation of the idle start control shown in FIG. 4.

Now, the operation of the idle start control will be described according to a sub-flowchart in FIG. 14.

When the procedure goes to Step S20 in FIG. 4 where the idle start control is started, the ECU 122 obtains the amount of intake air ICMD by the relational expression of amount of intake air ICMD=(learned value IXREF+value at starting ITWS)×atmospheric pressure compensation coefficient KIPA, and terminates the idle start control. Here, the value at starting ITWS is reduced in value as the water temperature or the oil temperature increases. The water temperature or the oil temperature is increased with the elapse of the operating time of the engine 22, and the friction of the engine 22 is also reduced. Therefore, the amount of intake air ICMD obtained by the idle start control may be reduced with the elapse of operating time of the engine 22.

In this manner, the idle start control obtains the amount of intake air ICMD using the value at starting ITWS irrespective of the engine speed IACNE. Here, the idle start control controls the opening of the throttle valve 57 so as to achieve the obtained amount of intake air ICMD. However, the opening of the throttle valve 57 is controlled after having performed the operations of the ICMD limit check of the idle control, the idle failsafe control, and the idle start control.

Now, the operations of the ICMD limit check of idle control, the idle failsafe control, and the idle start control will be described according to a sub-flowchart in FIG. 15.

Figure 15:
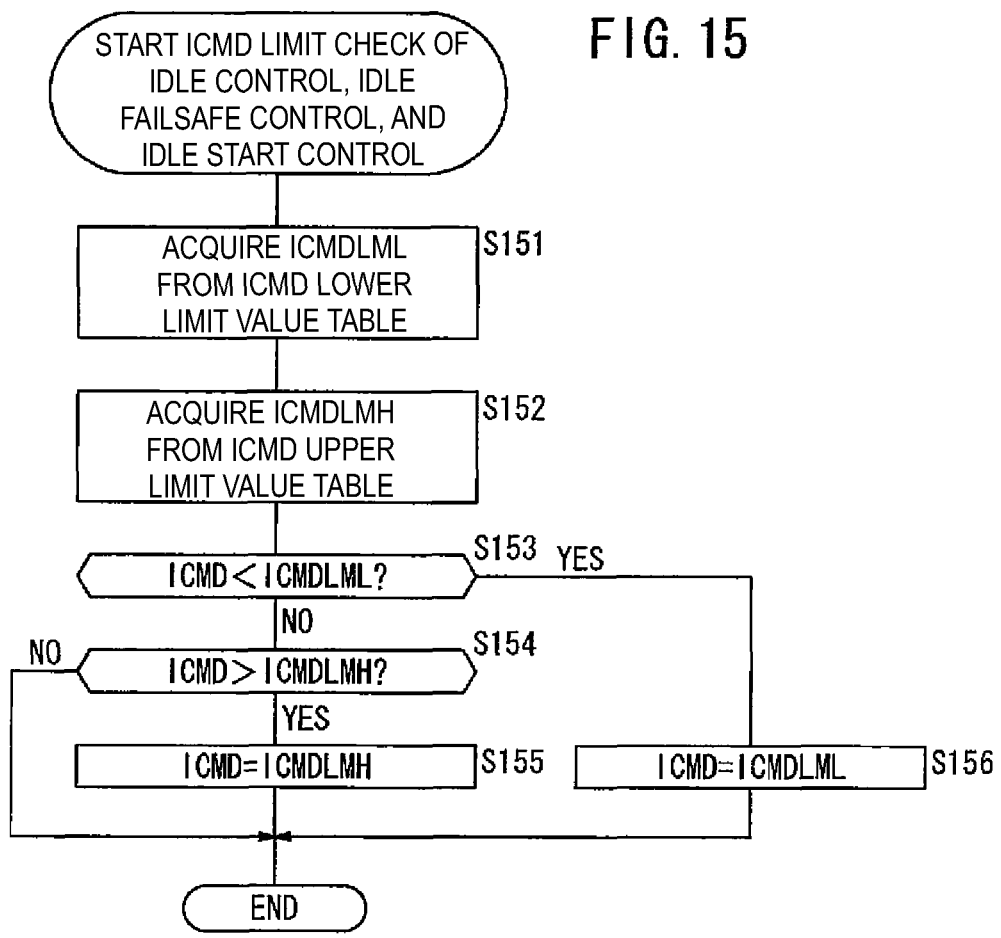
FIG. 15 is a sub-flowchart showing operations of the ICMD limit check of idle control, idle failsafe control, and idle start control in FIG. 3.

The procedure goes to Step S16 in FIG. 3, and the operations of the ICMD limit check of the idle control, the idle failsafe control, and the idle start control are started, the procedure goes to Step S151 in FIG. 15, where the ECU 122 acquires the lower limit value ICMDLML of the amount of intake air ICMD according to the current water temperature or the oil temperature TW from the ICMD lower limit value table stored in the memory 124.

Subsequently, the ECU 122 acquires the upper limit value ICMDLMH of the amount of intake air ICMD according to the current water temperature or the oil temperature TW from the ICMD upper limit value table stored in the memory 124 (Step S152).

Subsequently, the ECU 122 determines whether or not the amount of intake air ICMD obtained by the idle control, the idle failsafe control, or the idle start control is smaller than the lower limit value ICMDLML (Step S153).

When the ECU 122 determines that the obtained amount of intake air ICMD is not smaller than the lower limit value ICMDLML in Step S153, the ECU 122 determines whether or not the amount of intake air ICMD is larger than the upper limit value ICMDLMH (Step S154).

When the ECU 122 determines that the obtained amount of intake air ICMD is not larger than the upper limit value ICMDLMH in Step S154, the ECU 122 terminates the ICMD limit check of the idle control, the idle failsafe control, and the idle start control, and when the ECU 122 determines that the obtained amount of intake air ICMD is larger than the upper limit value ICMDLMH in Step S154, the ECU 122 sets the amount of intake air ICMD to the upper limit value ICMDLMH (Step S155), and terminates the ICMD limit check of the idle control, the idle failsafe control, and the idle start control. In other words, when the amount of intake air ICMD is larger than the upper limit value ICMDLMH, the amount of intake air ICMD is confined to the upper limit value ICMDLMH.

In contrast, when the ECU 122 determines that the amount of intake air ICMD is smaller than the lower limit value ICMDLML in Step S153, the ECU 122 sets the amount of intake air ICMD to the lower limit value ICMDLML (Step S156), and the ICMD limit check of the idle control, the idle failsafe control, and the idle start control is terminated. In other words, when the amount of intake air ICMD is smaller than the lower limit value ICMDLML, the amount of intake air ICMD is confined to the lower limit value ICMDLML.

The opening of the throttle valve 57 is controlled so as to achieve the amount of intake air ICMD after the limit check operations of the idle control, the idle failsafe control, and the idle start control. In this manner, when the amount of intake air ICMD is smaller or larger than the predetermined range, the amount of intake air ICMD is confined. Therefore, the excessive variations of the engine speed IACNE are prevented.

Figure 16:
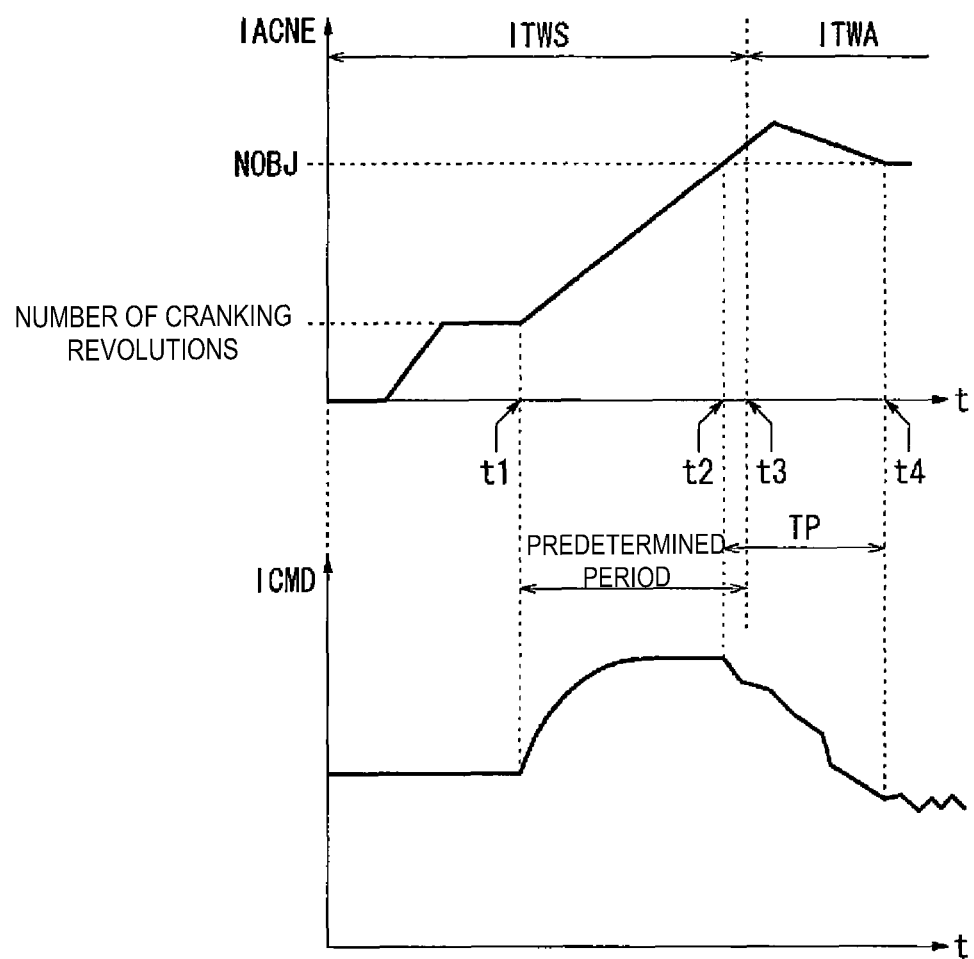
FIG. 16 is a drawing showing a time chart of the engine speed and an amount of intake air ICMD in a state of idling controlled by the related art.

FIG. 16 illustrates a time chart of the engine speed IACNE and the amount of intake air ICMD in a state of idling controlled by the related art. The value at starting ITWS is set to the basic supply value ITW as the default value, and when the engine 22 is started, and a timing t1 at which the engine speed IACNE exceeds the cranking revolution has elapsed, the idle feedback control which controls the opening of the throttle valve 57 is performed using the basic supply value ITW set to the value at starting ITWS so that the engine speed IACNE becomes the target idle speed NOBJ. The engine speed IACNE is gradually increased by the idle feedback control, and gets close to the target idle speed NOBJ.

When a timing t3 after a predetermined time elapsed from the timing t1 has reached, the basic supply value ITW is switched to the value at normal times ITWA and the idle feedback control which controls the opening of the throttle valve 57 is continued. Here, a timing t2 at which the engine speed IACNE reaches the target idle speed NOBJ is assumed to arrive at a timing earlier than the timing t3. When the engine speed IACNE reaches a speed close to the target idle speed NOBJ, the viscous resistance (friction) of the lubricant of the engine 22 is lowered. Therefore, the engine speed IACNE is not converged even when the target idle speed NOBJ is achieved and exceeds the target idle speed NOBJ.

Subsequently, when the basic supply value ITW is set to the value at normal times ITWA, the engine speed IACNE is gradually converged to the target idle speed NOBJ. The timing when the engine speed IACNE is converted to the target idle speed NOBJ is indicated by t4. The time from when the engine speed IACNE reaches the target idle speed NOBJ until when the engine speed IACNE is converged to the target idle speed NOBJ (t4−t2) is expressed by period TP.

In the related art, since the idle feedback control which controls the opening of the throttle valve 57 so that the engine speed IACNE reaches the target idle speed NOBJ is performed continuously even after the engine speed IACNE reaches the target idle speed NOBJ, the period TP becomes long.

In the related art, when the water temperature and the oil temperature of the engine 22 are lower than expected temperatures, the friction of the engine 22 is large and hence the engine speed IACNE might not reach the target idle speed NOBJ even though the predetermined time has elapsed from the timing t1. In such a case as well, when the predetermined time has elapsed, the basic supply value ITW is switched from the value at starting ITWS to the value at normal times ITWA and, consequently, the engine speed IACNE is lowered due to the switching and the length of the period from the timing t1 until the timing t4 when the engine speed IACNE is converged to the target idle speed NOBJ is increased.

It is also conceivable to switch the basic supply value ITW from the value at starting ITWS to the value at normal times ITWA at the timing t2 when the engine speed IACNE reaches the target idle speed NOBJ. However, when the throttle grip is operated temporarily before the engine speed IACNE reaches the target idle speed NOBJ, the engine speed IACNE temporarily increases to a value exceeding the target idle speed NOBJ according to the operation of the throttle grip and the basic supply value ITW is switched from the value at starting ITWS to the value at normal times ITWA, and hence the idle feedback control is performed at a time point when the throttle grip is restored. Therefore, the engine speed IACNE is reduced and the length of the period TP is increased.

Figure 17:
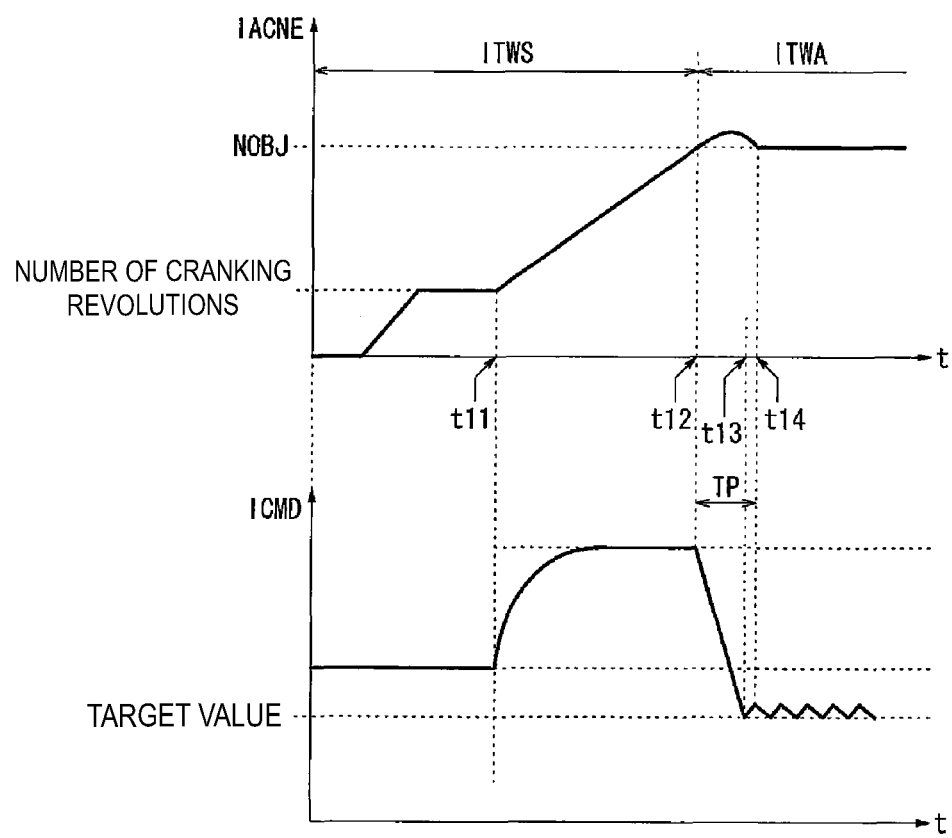
FIG. 17 is a drawing showing a time chart of a engine speed IACNE and the amount of intake air ICMD in a state of idling controlled by a control unit in the embodiment.

FIG. 17 illustrates a time chart of the engine speed IACNE and the amount of intake air ICMD in a state of idling controlled by the ECU 122 in this embodiment.

The value at starting ITWS is set to the basic supply value ITW as the default value, and when the engine 22 is started, and a timing t11 at which the engine speed IACNE exceeds the cranking revolution has elapsed, the idle feedback control is performed using the basic supply value ITW set to the value at starting ITWS so that the engine speed IACNE becomes the target idle speed NOBJ. The engine speed IACNE gets gradually close to the target idle speed NOBJ by the idle feedback control.

When the engine speed IACNE reaches the target idle speed NOBJ, the basic supply value ITW is set to the value at normal times ITWA and, simultaneously the idle feedback control is temporarily canceled, so that the idle control which controls the opening of the throttle valve 57 so that the amount of intake air ICMD is reduced according to the water temperature or the oil temperature using the basic supply value ITW set to the value at normal times ITWA irrespective of the engine speed IACNE. The timing when the engine speed IACNE reaches the target idle speed NOBJ is indicated by t12.

Subsequently, when the amount of intake air ICMD is reduced to the target value, the idle feedback control is started using the basic supply value ITW set to the value at normal times ITWA. The timing when the amount of intake air ICMD is reduced to the target value is indicated by t13, and the timing when the engine speed IACNE is converted to the target idle speed NOBJ is indicated by t14.

In this embodiment, the basic supply value ITW is switched from the value at starting ITWS to the value at normal times ITWA at the timing t12 when the engine speed IACNE reaches the target idle speed NOBJ and, simultaneously, the idle feedback control is cancelled temporarily and the idle control which controls the opening of the throttle valve 57 so that the amount of intake air ICMD is reduced according to the water temperature or the oil temperature using the basic supply value ITW is performed. When the amount of intake air ICMD is reduced to the target value, the idle feedback control is restarted, and hence the period TP may be reduced and the converging time to the target idle speed NOBJ of the engine speed IACNE may be reduced.

Since the basic supply value ITW is switched from the value at starting ITWS to the value at normal times ITWA at the timing t12 when the engine speed IACNE reaches the target idle speed NOBJ, even when the water temperature and the oil temperature of the engine 22 are lower than the expected temperatures, the basic supply value ITW is not set to the value at normal times ITWA before the engine speed IACNE reaches the target idle speed NOBJ. Therefore, the length of the period from the timing t11 until the timing t14 when the engine speed IACNE is converged to the target idle speed NOBJ may be reduced, and the length of the converging time of the engine speed IACNE to the target idle speed NOBJ may be reduced. Also, even when the throttle valve 57 is opened by the operation of the throttle grip when the value at starting ITWS is set as the basic supply value ITW, and the operation of the throttle grip is cancelled after the speed has exceeded the target idle speed NOBJ, the engine speed IACNE may be prevented from dropping instantaneously.

Also, even when the throttle grip is temporarily operated and the engine speed IACNE exceeds the target idle speed NOBJ before the engine speed IACNE reaches the target idle speed NOBJ, and hence the basic supply value ITW is switched from the value at starting ITWS to the value at normal times ITWA, the idle control is performed until the amount of intake air ICMD is reduced to the target value. Therefore, the length of the period TP may be reduced, and hence the converging time of the engine speed IACNE to the target idle speed NOBJ may be reduced.

In this manner, the idle feedback control which controls the opening of the throttle valve 57 is performed so that the engine speed IACNE reaches the target idle speed NOBJ using the basic supply value ITW set to the value at starting ITWS until the engine speed IACNE reaches the target idle speed NOBJ. The idle feedback control is cancelled temporarily after the engine speed IACNE has reached the target idle speed NOBJ, and the opening of the throttle valve 57 is controlled so that the amount of intake air ICMD is reduced according to the water temperature or the oil temperature of the engine 22 using the basic supply value ITW set to the value at normal times ITWA irrespective of the engine speed IACNE. Subsequently, when the amount of intake air ICMD reaches the target value, the idle feedback control is restarted using the basic supply value ITW set to the value at normal times ITWA. Accordingly, the length of the converging time of the engine speed IACNE to the target idle speed NOBJ may be reduced.

The value at starting ITWS and the value at normal times ITWA become smaller in proportion to the increase of the water temperature or the oil temperature of the engine 22. Therefore, the amount of intake air ICMD may be reduced in association with the lowering of the friction of the engine 22, increase in engine speed IACNE in association with the lowering of the friction of the engine 22 may be inhibited, and the engine speed IACNE may be controlled adequately.

The idle feedback control is performed when the conditions of execution of the idle feedback control are satisfied, that is, when the DCT 112 is in the neutral state, the throttle grip is not operated, and the engine speed IACNE and the opening of the throttle valve 57 are within the idle feedback control region. Therefore, execution of the idle feedback control at an adequate timing is achieved.

When the conditions of execution of the idle feedback control are not satisfied, the idle feedback control is canceled, and the opening of the throttle valve 57 is controlled so that the amount of intake air ICMD is reduced according to the water temperature or the oil temperature of the engine 22 using the basic supply value ITW. Therefore, adequate control of the amount of intake air ICMD is achieved.

When the amount of intake air ICMD is larger than the upper limit value ICMDLMH, the amount of intake air ICMD is confined to the upper limit value ICMDLMH. When the amount of intake air ICMD is smaller than the lower limit value ICMDLML, the amount of intake air ICMD is confined to the lower limit value ICMDLML. Therefore, excessive variations of the engine speed IACNE are prevented.

Although the limit check of the amount of intake air ICMD obtained by the idle feedback control in Step S12 in FIG. 3 is performed in Step S13. However, the operation in Step S13 does not have to be performed. In such a case, the idle feedback control in Step S12 adjusts the opening of the throttle valve 57 so as to achieve the obtained amount of intake air ICMD.

Although the limit check of the amount of intake air ICMD obtained by the idle control in Step S15 in FIG. 3, the amount of intake air ICMD obtained by the idle failsafe control in Step S18 in FIG. 4, and the amount of intake air ICMD obtained by the idle start control in Step S20 is performed in Step S16, the operation in Step S16 does not have to be performed. In such a case, the idle control in Step S15, the idle failsafe control in Step S18, and the idle start control in Step S20 adjust the opening of the throttle valve 57 so as to achieve the obtained amount of intake air ICMD.

Although the invention has been described thus far using the preferred embodiment, the technical scope of the invention is not limited to the scope described in the above-described embodiment. It is apparent for those skilled in the art that various modifications or improvements may be applied to the above-described embodiment.

In other words, although the present invention has been described herein with respect to a number of specific illustrative embodiments, the foregoing description is intended to illustrate, rather than to limit the invention. Those skilled in the art will realize that many modifications of the illustrative embodiment could be made which would be operable. All such modifications, which are within the scope of the claims, are intended to be within the scope and spirit of the present invention.

What is claimed is:

1. An engine control apparatus comprising:
an engine having an intake air duct;
an intake air flow control valve provided in the intake air duct of the engine, and configured to adjust an amount of intake air supplied to the engine;
an engine speed sensor configured to detect a engine speed of the engine;
a temperature sensor configured to detect a warm-up state of the engine; and
a control unit configured to:
operate the intake air flow control valve to supply a second amount of intake air to the engine during a cold engine operation, which is more than a first amount of intake air used at the time of normal idling operation,
perform a feedback control so that the engine speed reaches a target warm idle speed when the engine has warmed up to a predetermined operating temperature, and
to perform the feedback control based on the first amount of intake air after predetermined requirements are satisfied;
wherein the control unit performs the feedback control based on the second amount of intake air until the engine speed reaches the target warm idle speed, and then controls the intake air flow control valve to supply a predetermined amount of intake air which is less than the second amount of intake air for a predetermined period until the engine speed exceeds the target warm idle speed, and then performs the feedback control based on the first amount of intake air,
wherein the control unit is operable to determine whether or not conditions of execution of the idle feedback control are satisfied and execute the feedback control, and the conditions of execution of the idle feedback control are satisfied when a transmission connected to the engine is in a neutral state, a throttle grip which is operable to increase the engine speed is not operated by an operator, and the engine speed and the opening of the intake air flow control valve are within an idle feedback control region.

2. An engine control apparatus according to claim 1, wherein the intake air flow control valve has an opening formed therein; and wherein the control unit is operable to confine the opening of the intake air flow control valve so that the amount of intake air becomes the upper limit value when the amount of intake air taken by the engine becomes larger than the upper limit value, and to confine the opening of the intake air flow control valve so that the amount of intake air becomes the lower limit value when the amount of intake air taken by the engine becomes smaller than the lower limit value.

3. An engine control apparatus according to claim 1, wherein the intake air flow control valve has an opening formed therein; and wherein the control unit is operable to confine the opening of the intake air flow control valve so that the amount of intake air becomes the upper limit value when the amount of intake air taken by the engine becomes larger than the upper limit value, and to confine the opening of the intake air flow control valve so that the amount of intake air becomes the lower limit value when the amount of intake air taken by the engine becomes smaller than the lower limit value.

4. A vehicle comprising:
an engine having an intake air duct;
a throttle valve arranged in the intake air duct for supplying intake air to the engine;
an engine speed sensor which detects a rotary speed of the engine; and
a control unit which controls operation of said engine;
wherein the control unit is operable to:
detect a warm-up state of the engine; regulate said throttle valve so that the amount of intake air becomes a second amount of intake air which is larger than a first amount of intake air used at a time of normal idling operation and perform a feedback control so that the engine speed reaches a target idle speed when the engine is not in the warm-up state, and perform the feedback control based on the first amount of intake air after predetermined requirements are satisfied; and
perform the feedback control based on the second amount of intake air until the engine speed reaches the target idle speed, then control the amount of intake air to an amount smaller than the predetermined second amount of intake air for a predetermined period until the engine speed exceeds the target idle speed, and then perform the feedback control based on the first amount of intake air,
wherein the control unit is operable to determine whether or not conditions of execution of the idle feedback control are satisfied, and execute the feedback control when the conditions of execution of the idle feedback control are satisfied, and the conditions of execution of the idle feedback control are satisfied when a transmission connected to the engine is in a neutral state, a throttle grip which is operable to increase the engine speed is not operated, and the engine speed and the opening of the intake air flow control valve are within an idle feedback control region.

5. A vehicle according to claim 4, further comprising a temperature sensor operatively connected with the control unit for detecting temperature of engine coolant; wherein the first amount of intake air and the second amount of intake air decrease in proportional to an increase of temperature of the engine coolant detected by the temperature sensor.

6. A vehicle according to claim 4, wherein the control unit is operable to determine that when the engine speed and the opening of the throttle valve of a previous time are within the idle feedback control region, a current engine speed does not exceed a first speed and that when the opening of the throttle valve of current time does not exceed a maximum opening, the state is within the idle feedback control region, and to determine that when the engine speed and the opening of the throttle of the previous time are not within the idle feedback control region, the current engine speed does not exceed a second speed smaller than the first speed and that when the opening of the throttle valve of the current time does not exceed a lower limit opening smaller than the maximum opening, the state is within the idle feedback control region.

7. A vehicle according to claim 4, wherein the control unit is operable to confine the opening of the throttle valve so that the amount of intake air becomes the upper limit value when the amount of intake air taken by the engine becomes larger than the upper limit value, and to confine the opening of the throttle valve so that the amount of intake air becomes the lower limit value when the amount of intake air taken by the engine becomes smaller than the lower limit value.

8. A vehicle comprising
an engine,
an intake air duct connected to the engine, and having a throttle valve arranged therein;
a control unit for controlling amount of intake air supplied to said engine through the throttle valve having an opening formed therein,
a plurality of sensors connected to the control unit; said plurality of sensors comprising an engine revolution sensor for detecting revolutions of the engine,
a throttle valve opening sensor for detecting the opening of the throttle valve, and
a temperature sensor for detecting temperature of engine coolant;
wherein the control unit is operable to control the opening of said throttle valve so that the amount of intake air becomes a second amount of intake air which is greater than a first amount of intake air used at the time of normal idling operation and perform a feedback control so that the engine speed reaches a target idle speed when the engine is not in the warm-up state, and perform the feedback control based on the first amount of intake air after predetermined requirements are satisfied; further the control unit is operable to perform the feedback control based on the second amount of intake air until the engine speed reaches the target idle speed, then control the opening of the throttle valve so that the amount of intake air smaller than the predetermined second amount of intake air for a predetermined period until the engine speed exceeds the target idle speed, and then perform the feedback control based on the first amount of intake air,
wherein said control unit is further operable to determine whether or not conditions of execution of the idle feedback control are satisfied, and execute the feedback control when the conditions of execution of the idle feedback control are satisfied, and the conditions of execution of the idle feedback control are satisfied when a transmission connected to the engine is in a neutral state, a throttle grip which is operable to increase the engine speed is not operated, and the engine speed and the opening of the intake air flow control valve are within an idle feedback control region.

9. A vehicle according to claim 8, wherein the first amount of intake air and the second amount of intake air decrease in proportion to an increase of temperature of the engine coolant.

10. An engine control apparatus comprising:
an engine having an intake air duct;
an intake air flow control valve provided in the intake air duct of the engine, and configured to adjust an amount of intake air supplied to the engine;
an engine speed sensor configured to detect a engine speed of the engine;
a temperature sensor configured to detect a warm-up state of the engine; and
a control unit configured to: operate the intake air flow control valve to supply a second amount of intake air to the engine during a cold engine operation, which is more than a first amount of intake air used at the time of normal idling operation, perform a feedback control so that the engine speed reaches a target warm idle speed when the engine has warmed up to a predetermined operating temperature, and to perform the feedback control based on the first amount of intake air after predetermined requirements are satisfied;
wherein the control unit performs the feedback control based on the second amount of intake air until the engine speed reaches the target warm idle speed, and then controls the intake air flow control valve to supply a predetermined amount of intake air which is less than the second amount of intake air for a predetermined period until the engine speed exceeds the target warm idle speed, and then performs the feedback control based on the first amount of intake air;
wherein the first amount of intake air and the second amount of intake air decrease in proportion to an increase of one of a water temperature and an oil temperature of the engine;
wherein the control unit is operable to determine whether or not conditions of execution of the idle feedback control are satisfied, and execute the feedback control when the conditions of execution of the idle feedback control are satisfied; and
wherein the control unit is operable to determine that when a previous engine speed and a previous intake air flow control valve opening are within the idle feedback control region, a current engine speed does not exceed a current speed, and when the opening of the intake air flow control valve of the current time does not exceed a maximum opening, the state is within the idle feedback control region, and
to determine that when the engine speed and the opening of the intake air flow control valve of the previous time are not within the idle feedback control region, the current engine speed does not exceed a second speed smaller than the current speed, and that when the current intake air flow valve opening does not exceed a lower limit opening smaller than the maximum opening, the state is within the idle feedback control region.

11. An engine control apparatus according to claim 10, wherein the intake air flow control valve has an opening formed therein; and wherein the control unit is operable to confine the opening of the intake air flow control valve so that the amount of intake air becomes the upper limit value when the amount of intake air taken by the engine becomes larger than the upper limit value, and to confine the opening of the intake air flow control valve so that the amount of intake air becomes the lower limit value when the amount of intake air taken by the engine becomes smaller than the lower limit value.

* * * * *